to as "vehicle X"; the dispersible product, which is initially dispersed in the vehicle X will be referred to as the "dispersible product X"; and the resulting dispersion obtained by carrying out the procedures of the invention will be referred to as "dispersion X." The dispersed phase or "dispersed product X" in "dispersion X" is preferably different from the "dispersible product X," having undergone changes during the instant procedure, and such dispersed phase may be a thermoplastic or thermoset resin in discrete particulate form, but it is an organic synthetic resin that is normally solid, i.e., solid under ordinary conditions of use such as room temperature, etc. For convenience also the product X used in the practice of the invention may be referred to as consisting of, containing and/or producing (during the process of the invention) a "first" resin or the "pigment" resin.

In certain instances, thermoplastic resins are preferred for use in the instant invention, and this type of resin will be considered first. Although the thermoplastic pigment resin preferred for this purpose is a co-condensate of an aromatic sulfonamide, a polyamino, triazine and formaldehyde, such as is described in Zenon Kazenas U.S. Patents No. 2,908,954 and 2,938,873, it will be appreciated that other thermoplastic organic resins may be used and/or produced in situ in the practice of the instant invention. For example, one may use thermoplastic resinous condensates of formaldehyde and aromatic sulfonamides such as o-toluenesulfonamide, p-toluenesulfonamide, mixtures thereof, sulfanilamide, benzenesulfonamide and alkyl derivatives thereof, in which the sulfonamido group is attached directly to the aromatic nucleus through the sulfur atom and there are two reactive amide hydrogens, as well as the corresponding alpha-toluenesulfonamide compounds, all such sulfonamides being referred to herein as aromatic sulfonamides.

In addition, the thermoplastic pigment resin which may be used and/or produced in situ in the dispersed phase in the practice of the instant invention may be a co-condensate formed of an aromatic monosulfonamide component, a formaldehyde (or paraformaldehyde) component, and a polyamino resin forming component, which is a compound containing a plurality of amino (or amido) groups each attached to a carbon atom which in turn is attached through a double bond to an oxygen, sulfur or nitrogen atom. The last-mentioned compounds include urea (wherein two amino groups are attached to a carbon atom which in turn is attached to oxygen by a double bond), thiourea (wherein two amino groups are attached to a carbon atom which in turn is attached to a sulfur atom by a double bond), and guanidine (wherein two amino groups are attached to a carbon atom which in turn is attached to a NH group by a double bond). Such polyamino compounds (often also referred to as "polyamido" compounds) ordinarily form thermosetting resins with formaldehyde; but in the practice of the instant invention they are preferably used in co-condensation products with aromatic sulfonamides in such proportions as to produce a thermoplastic resin, in accordance with the general teachings of the aforementioned Kazenas patents.

Other polyamino compounds which may be used for co-condensation includes dicyandiamide, biuret, etc. Preferred polyamino compounds for use in the practice of the instant invention are, however, compounds wherein the molecule has a plurality of $NH_2$ groups each connected to a carbon atom contained in a heterocyclic ring, said carbon atom being connected by a double bond to an intracyclic nitrogen atom. The heterocyclic rings thus include triazole, diazole, diazine and triazine rings. Such compounds include guanazole, 1-phenylguanazole, 4-aminoguanazole, 1-carbamylguanazole, 1-guanylguanazole, 1-acetylguanazole, 1-benzoylguanazole, 2,4-diamino-5-hydroxypyrimidine, melamine and the guanamines such as those disclosed in Kazenas Patent No. 2,938,873.

Another group of compounds which can be used in the preparation of pigment resins for use hereunder are water insoluble condensation products of the cyclic ureides such as dimethyl hydantoin, ethylene urea, acetylene urea, etc., i.e. resin-formers containing a plurality of —NH— groups each attached to a carbon atom which in turn is attached by a double bond to =O, =N— or =S. Preferably each such carbon atom and such —NH— groups are intracyclic and the =O, =N— or =S groups are exocyclic in heterocyclic rings.

The formaldehyde component used may be formaldehyde or a formaldehyde generating derivative thereof such as paraformaldehyde, hexamethylene tetramine, or the like.

As mentioned, the thermoplastic pigment resins preferred for use and/or production in the practice of the instant invention are those described in Kazenas Patent No. 2,809,954 and 2,938,873, (which patent disclosures are included herein by reference) wherein the polyamino component is a polyaminotriazine component, defined in such patents as an aminotriazine having at least two amino groups.

The amount of such polyamino component in the thermoplastic pigment resin is preferably an amount insufficient to render the resin thermoset, but sufficient to impart substantial insolubility to the resin in common petroleum solvents, which are often used in paint vehicles.

Although the process of the invention, in another aspect, results in the formation of dispersed minute particles of thermoset resin, it will be appreciated that once the resin is completely thermoset, the resin does not undergo any further changes in size or shape. It will also be appreciated that if the product X comprises an extremely heat sensitive, rapidly thermosetting resin, this material must be dispersed initially with great care in the practice of the instant invention, so that the desired dispersion may be carried out before the resin becomes thermoset. Also, it is often useful to prepare a product X of this type (for the formation in the ultimate dispersion X of either a thermoplastic or thermoset resin) in a form in which it is not too readily converted to the finally desired condition of the resin dispersed in the ultimate dispersion X. It is advantageous in certain instances, thus, to prepare an initial condensation product X for the dispersed phase that has less than the ultimately desired amount of formaldehyde, to process (initially or completely) the dispersed phase in accordance with the instant invention, and then add to the system additional formaldehyde or formaldehyde-generating material which will in turn react with the dispersed phase resin to effect the formation of a completely condensed pigment resin having a higher softening point than the starting material and improved light stability and other improved properties.

The continuous phase or vehicle X in which the aforementioned product X is dispersed in the practice of the instant invention, for example, is a solid-film-forming viscous liquid vehicle (capable for forming a translucent film, and preferably a substantially transparent, clear film). Increased viscosity in the continuous liquid phase materially assists in effecting the desired dispersion and formation of discrete particle size of the dispersed phase during agitation in accordance with the practice of the invention. The liquid vehicle forming the continuous phase is a material in which the dispersed phase is substantially insoluble under the conditions of the process steps of the invention. Preferably, the product X and the vehicle X are substantially mutually insoluble, and in the ultimate dispersion X, the dispersed resin is substantially insoluble in the vehicle X. In other words, the dispersed (pigment resin) phase is substantially insoluble in its ultimate normally solid form (as well as in its initial transitory forms earlier in the process) in the continuous vehicle X phase (when the same is in its original liquid form or when it is in its ultimate solid-film form).

In general, the continuous phase consists essentially of or comprises a binder for the pigment or dispersed phase. It is ordinarily liquid at room temperature as well as the other temperatures employed in the practice of the invention, usually being a viscous liquid material that is solidifiable in whole or in part in ultimate use, in that it is a solid-film former of the type used in coating compositions, paints, inks, etc.

Typical examples of the continuous phase preferred are ordinary vehicles of the paint and ink trade, such as oil-modified alkyd vehicles, styrenated alkyd vehicles (substituted or unsubstituted styrenes), cyclized rubber vehicles, and the like which ordinarily contain petroleum solvents, drying oils and/or similar liquid solvents.

Preferably, the continuous phase is formed of an organic resin dissolved in and/or thinned with a liquid solvent therefor. One aspect of the instant invention involves maintaining in solution in the liquid continuous phase an organic resin (hereinafter often referred to as the "second" resin or "solid-film-forming" resin) to maintain a substantial viscosity in the continuous phase, thereby to effect, in combination with the agitation, a shearing action to bring about the desired reduction of the molten dispersed phase to a substantially uniform fine particles size. The proportion of such second resin employed in the liquid phase affords a control for the viscosity in the liquid phase in the practice of the invention. The continuous phase may be formed of varnish compositions containing solid-film formers such as vinyl toluene and styrene copolymers, etc. Modified phthalic anhydride linseed oil, soya oil or dehydrated castor oil alkyd varnishes and the like may be used. Preferred for use in the practice of the invention are styrenated oil-modified alkyds such as those described in U.S. Patents No. 2,919,253 and 2,944,991, in which oil-modified alkyds copolymerized with styrene and/or ring substituted alkyl or halo styrenes are disclosed; the term "styrenated" as herein used shall be understood to include modification by styrene as well as ring substituted alkyl or halostyrene.

EXAMPLE 1

Using a heated container set at 150° C. and a conventional high speed disperser, 1.5 grams of borax (decahydrate) are dissolved in 20 grams of water at approximately 90° C. Then 2 drops (approximately 0.08 gram) of 70% aqueous phosphorous acid is added. (The phosphorous acid is preferably employed to improve the dye function and as a chelating agent for any iron impurities in the reaction mass.) Then, 22.1 grams of 91% (active) paraformaldehyde (flake form), 51.3 grams of a mixture of o- and p-toluenesulfonamide, 12.6 grams of melamine, and 1.5 grams of Brilliant Yellow 6 G base are added successively with stirring and heated up to about 100° C., until such additions appear to be completely dispersed (i.e. to obtain, as "product X," an incompletely condensed amide-aldehyde reaction product which is subtantially water insoluble although retaining some free and combined water). The hot aqueous reaction mass gives the appearance of a solution; but the cooled "product X" indicates differently, being a solidifiable taffy-like material and not an aqueous solution.

A vehicle herein referred to as "vehicle X" is formed separately, thoroughly mixing 10 parts of boiled linseed oil, 25 parts of a 100% solids in the form of 10% styrenated alkyd (a semi-drying oil dehydrated castor oil-modified glycerolphthalate) copolymer resin ("Scopol 41N") hereinafter referred to as "vehicle resin S," and 45 parts of an ink vehicle hereinafter referred to as "blend Y" consisting essentially of 44% solids in the form of a styrenated alkyd copolymer resin (resin component of "Cycopol" 341–17) and 56% of a high boiling (about 240° C.) saturated aliphatic hydrocarbon ink solvent (commercially available as "Inkol–O"), to form a uniform, hydrophobic organic liquid vehicle capable of forming a solid film on drying, i.e. a solid-film-forming vehicle). Vehicle X and product X are substantially mutually insoluble.

A charge of 77.2 grams of vehicle X at room temperature is added to product X manufactured above at about the boil (preferably it is not allowed to stand for long at temperatures of 100° C. or more because the condensation may be carried too far for most purposes in the subsequent steps) in the above noted conventional high speed disperser, which is operated at high speed to form an initial uniform "product-in-vehicle" emulsion i.e. an emulsion wherein product X is intimately dispersed in the continuous phase formed by vehicle X. Agitation is continued until a thin film of the emulsion smeared or rubbed on glass transmits light like a clear stained glass window (with or without dyes), which is the "smear test" considered to be an adequate test for fineness of dispersion. As the agitated and heated emulsion reaches 105° C., a charge of 0.75 gram of Rhodamine B Extra (Colour Index No. 749) is thoroughly dispersed therein; and as the temperature reaches 125° C., a charge of 4.50 grams of Rhodamine 6 GDN (Colour Index No. 752) dye paste Y is dispersed therein. The dye paste Y is made by dispersing 33.3 parts of Rhodamine 6 GDN in 23.2 parts of Inkol–O and 43.5 parts of the aforesaid vehicle resin S. At about 130° C. there is added 5 grams of a low molecular weight polyethylene polymer AC–6. The disperser is continued at high speed and the dispersion is heated to substantially 140° C. and held at 135–140° C. for about 15 minutes, at which temperature the dispersion is held with continued high speed agitation until volatiles are no longer being given off (i.e. as evidenced by foaming, which is evidence of advancement of the amide-aldehyde resin-forming condensation reaction toward completion). Then, an additional organic liquid charge of Inkol–O is added to the dispersion to replace solvent lost during the heating step, and thoroughly mixed for 5 minutes with high speed agitation. The dispersion is then dumped and cooled to room temperature, to obtain a resulting dispersion herein referred to as "dispersion X."

If no dye is used in the foregoing procedure, the resulting dispersion X is a clear material that may be used as a "clear" overcoat to deposit a high gloss film on coated or uncoated surfaces or it may be sold to distributors or even end users who desire to blend their own dye formulations to form inks, paints, etc. In the instant procedure, a dye formulation is used to obtain a printing ink composition. The yellow dye is added as described herein during formation of product X, and the red dyes are added during heating of the agitated dispersion prior to the previously described cooling to obtain dispersion X.

As used herein, the terms "parts" and "percent" mean parts and percent by weight, unless otherwise designated; and reference to "mols" means the parts corresponding to a molar proportion, e.g. if parts are grams in a given run, then one mol of paraformaldehyde or formaldehyde is one gram-mol, i.e., 30 grams, or 30 parts by weight.

The resulting dispersion X is found to be a brilliantly colored material containing extremely fine dyed amide-aldehyde resin particles dispersed in the vehicle forming a concentrate which may be converted to approximately 45% pigment resin solids in order to obtain a material of composition suitable for use as a printing ink.

The dispersed phase amide-aldehyde resin particles in dispersion X resulting in the initial run are so small that 1000 power magnification does not give particle resolution; but electron microphotographs at 30,000 power indicate that by far the bulk of the dispersed particles are substantially spheroidal particles in the submicron range: 0.01 to 0.02 micron.

EXAMPLE 2

A charge of 100 grams of water, 66.6 grams of 91% paraformaldehyde, and 228 grams of a mixture of o- and

United States Patent Office 3,412,035
Patented Nov. 19, 1968

3,412,035
METHOD FOR PRODUCING FINE PIGMENT PARTICLES IN A LIQUID VEHICLE
Maurice D. McIntosh, Willoughby, Zenon Kazenas, Euclid, and Joseph L. Switzer, Gates Mills, Ohio, assignors to Switzer Brothers, Inc., Cleveland, Ohio, a corporation of Ohio
No Drawing. Continuation-in-part of applications Ser. No. 70,927, Nov. 22, 1960, Ser. No. 274,971, Apr. 22, 1963, and Ser. No. 291,272, June 28, 1963. This application Aug. 16, 1966, Ser. No. 572,684
44 Claims. (Cl. 252—301.2)

This is a continuation-in-part of our applications Ser. No. 70,927, filed Nov. 22, 1960 (now abandoned), Ser. No. 274,791, filed Apr. 22, 1963, and Ser. No. 291,272, filed June 28, 1963.

Attention is also directed to copending McIntosh (sole) application Ser. No. 196,860 (filed May 21, 1962) and Ser. No. 582,511 (filed Sept. 28, 1966).

The instant invention relates to fine particle production, a method of producing an improved dispersion of finely divided solid particles in a liquid vehicle, and the resulting composition.

Although the instant invention may have applications in a number of fields, it is particularly useful in the manufacture of color compositions containing resin pigments. Such pigments may be used in the production of coating compositions (i.e. including paints, printing inks, silk screen colors, etc.) having many useful properties. The pigments are formed of normally solid resins in particulate form having dissolved, dispersed or fixed therein a suitable coloring agent, which in the case of daylight fluorescent color is a fluorescent dye dissolved or dispersed in the pigment in concentrations effective for daylight fluorescence (as more fully described, for example, in Joseph L. Switzer et al. U.S. Patent No. 2,653,109 and Zenon Kazenas U.S. Patent Nos. 2,809,954 and 2,938,-873, incorporated herein by reference). An advantage of the instant invention, however, is that the concentrations of fluorescent dyes effective for daylight fluorescence may be materially increased (e.g. up to 10–15%) in the fine particles of the instant invention.

Heretofore, some thermoset resinous pigments had been used, but one of the principal difficulties with the thermoset resins was that they were extremely difficult to grind to the desired pigment particle size. In contrast, thermoplastic pigment resins produced in accordance with the aforesaid patents did possess unusual ease of resins, however, have had the disadvantages found with most pigments that are ground by conventional grinding means, such as ball mills, pulverizers, air jets and the like in that there is a tendency to produce a wide range of particle sizes during such grinding. As grinding continues one does not reduce the larger particles alone but apparently the smaller as well as the larger particles are reduced in size. If the particle size is too large, then an unsatisfactory coating composition is produced, and extensive time is consumed in milling the composition to reduce the "average" particle size so that the larger particles are not deleterious. On the other hand, in the case of daylight fluorescent pigments, if the ground particle size is too small, it has been previously understood in this art that one obtains a color which is substantially less effective than the optimum color desired and excessive total pigment body.

In the past, in order to obtain a small and yet uniform ground particle sized pigment, various systems of classification or separation have been proposed. By the use of such systems, it is possible to obtain the desired particle size. The larger particles can be returned to the grinding system for reduction in size. The smaller particles are, however, unusable and must be either discarded or reworked into a gross form for regrinding. Generally speaking, such classification systems are expensive to operate and result in losses of expensive materials. In addition, in practical operation such systems give a fairly wide range of particle size.

More recently, we have provided a novel method of obtaining a very fine uniform particle size for a normally solid thermoplastic organic resin (either colorless or colored), which may be employed as a pigment for the purposes described; and one aspect of our new method and the compositions resulting therefrom are disclosed in detail in our copending application Ser. No. 70,927, filed Nov. 22, 1960, which is incorporated herein by reference. An important feature of the invention described in our said application resides in the uniformity of particle size, or the fine "cut" in particle size which may be obtained. For example, by the use of conventional grinding and air classification systems, one may obtain a pigment with an average particle size of 3 to 4 microns, although the actual range in particle size is from 15 or 20 microns down to less than 1 micron in size. In contrast, in the practice of the invention described in our application Ser. No. 70,927 one may obtain an average particle size of 3 to 4 microns with substantially no particles less than 2 microns or more than 6 microns in size, and with a great majority of the particles within the 3 to 4 micron range. In comparing this achievement with certain embodiments of the present invention, however, it must be appreciated that in the practice of the present invention fantastically small particle sizes, for example, in the 0.01 to 0.02 micron range may be obtained with the great bulk of the particles being within narrow particle size limits and being formed of not only thermoplastic but also thermoset resins.

The invention described and claimed in our application Ser. No. 70,927 involves the method of producing the improved dispersion of solid particles in situ in a liquid vehicle, which comprises developing a shearing action which may be referred to as agitating, as by mechanical stirring, homogenization, kinetic dispersion, ultrasonics, vibration and the like, in a mixture consisting essentially of a dispersible phase of normally solid substantially completely condensed thermoplastic organic resin in molten form in a continuous phase that is formed of a liquid vehicle (preferably a solid-film-forming liquid vehicle) in which the dispersed phase is substantially insoluble, under the ordinary conditions of use, and then solidifying in situ the dispersed phase (e.g. by converting from molten to solid particulate state). This procedure results in a dispersion wherein a substantial improvement in uniformity of particle size is obtained. An additional advantage resulting from the foregoing procedure arises from the fact that coating compositions prepared accordingly have been found to possess improved texture and appearance. Paints prepared from such compositions may be found to have high gloss, or an enamel-like effect without the necessity for using a clear overcoat.

The invention claimed in our application Ser. No. 70,927 is, however, directed primarily to the concept of obtaining an intimate dispersion of organic pigment resin particles preferably in molten form in the vehicle which resin is substantially completely condensed prior to dispersion. The disclosure suggests that such molten form may be obtained merely by heating, and it may be obtained more easily or at a lower temperature by the addition thereto of (compatible) plasticizers which effectively depress the melting point or softening range. This may be a fugitive plasticizer in the form of a volatile material, dimethyl formamide, which functions as such a plasticizer but is also a solvent for the dispersed resin. In one aspect, the invention involves the use of water and/or other volatile liquid as a plasticizer with what ultimately results as the dispersed pigment resin particles. The invention also involves what is believed to be at least a liquefication of such pigment resin forming component, in situ in the vehicle, in combination with such volatile plasticizer and/or as such volatile plasticizer is released and/or separated from the ultimately formed discrete, dispersed, solid pigment resin particles.

In the preferred embodiment of the invention the pigment resin forming component is believed to undergo such momentary liquefication, in situ in the vehicle, while it is dispersed in the continuous liquid vehicle or phase at an early stage of thermo-condensation, thus having very high fluidity at the time of dispersion.

Since even the preferred so-called thermosetting resins undergo at least momentary liquefication during their conversion to the thermoset condition, the aspect of the instant invention involving liquefication in situ affords the distinct advantage of using such thermosetting resins as well as the known thermoplastic resins as the very fine pigment resin dispersions obtained herein. Although the general advantages described in our application Ser. No. 70,927 are also achieved in the practice of the instant invention, the instant invention additionally affords advantages in versatility in the types of pigment resin which may be used and/or produced (i.e. including thermosetting and thermoset resins) and in the uses to which the resulting dispersions may be put, in view of the much finer particle sizes that may be achieved in the practice of the invention. The coating, paint, ink or the like compositions which are prepared according to the instant invention have improved texture and appearance. Such materials so prepared may be found to have high gloss, clarity, and/or transparency, even with a high pigment to vehicle ratio, so that they may be used to obtain an enamel-like and/or glass-like effect without the necessity of using a clear overcoat, or they may themselves be used as the clear overcoat to impart such effect. In particular, this extreme transparency with high color pigment to vehicle ratio affords unique advantage in the production of three color process inks. Although it is not desired to limit the invention to any particular theory, it is believed that the method of the instant invention results in the creation of particles, which may be extremely smooth-surfaced and minute in size, but which are believed to be of generally spheroidal form and are thus more transparent in the vehicle than the prior art particles which were mechanically manufactured (so as to have light-diffusing surfaces of "fracture," as contrasted to smooth, rounded, generally spherical, light-transmitting rather than light-diffusing surfaces).

In addition, in the practice of the instant invention it is possible to obtain such extremely minute and/or generally rounded or spheroidal dispersed pigment resin particle sizes which may average in approximately the neighborhood of 0.02 micron which average is approximately 100 times smaller than the very fine, high-gloss-imparting, intimately dispersed pigment resin particles (in the 2, 3 and 4 micron range) which are obtained usually in the practice of the invention of our application Ser. No. 70,927. It is known that the increase in surface area of a given total volume of spheres of diameter $d$ as compared to an equal volume of spheres of smaller diameter $d'$ is inversely proportional to the decrease in diameters $d:d'$, so in the instant situation the surface area of discrete minute (spheroidal) particles of the instant invention is approximately 100 times greater than that obtained with the spheroidal particles of pigment resin the neighborhood of 2 microns in size, which latter spheroidal pigment resin particles imparted a significant and conspicuous improvement in gloss and texture to coating compositions made therefrom, as compared to the prior art compositions made from ground resin particles. The remarkable improvement thus obtained in the preferred practice of the instant invention in affording a total increase in pigment surface area in the neighborhood of 100 times is manifested in not only improvements in the glossy appearance hereinbefore described, but also in improvements in texture and brightness of color, as well as improvements in versatility of use of the compositions in ink fields, particularly, where the extremely fine particle size of the invention has made possible for the first the time the successful use of single impression letter-press and litho-ink formulations embodying high concentrations of the instant pigment resins, dyed forms of the instant pigment resins, and particularly daylight fluorescent pigment resins.

In addition, the fundamental aspect of the invention involving production of the dispersed pigment resin particles in situ in the vehicle phase is believed to involve unique chemical and/or physical phenomena involving and/or comparable to thorough wetting of the discrete dispersed resin particles with the vehicle in such manner as to impart improved results in paint and ink rheology (i.e. thixotropy, stability of suspension, etc.) and/or optical effects. Such improved results are manifested particularly with the most minute sized pigment particles of the invention.

It is, therefore, an important object of the instant invention to provide improved methods of manufacture and improved products comprising extremely minute and uniformly dispersed or dispersible resin particles.

It is another object of the instant invention to produce the dispersed pigment resin particles in situ in the solid-film-forming liquid vehicle with which they are to be used and thus to provide better wetting of the dispersed particles by the vehicle than might be obtained through milling of dry pigment resin particles into a vehicle.

It is another object of the instant invention to provide an improved method of producing a highly concentrated dispersion of extremely fine solid organic resin particles in a liquid vehicle, and an improved product resulting therefrom.

It is another object of the instant invention to provide an improved method of producing coating and ink compositions by the production of a dispersion of a normally solid organic resinous pigment, in extremely fine particulate form, being substantially uniformly sized (and/or so extremely minute in size that they apparently function for the uses intended as if they are substantially uniformly sized) and dispersed in a solid-film-forming vehicle which is capable of acting as a binder for the pigment dispersed therein; i.e. when spread in a thin film on a surface is capable of binding the dispersed phase carried by said vehicle to such surface to which it is applied.

The invention consists in a superior dispersion, which can be produced by forming particles of a synthetic organic resin, as a solid dispersed phase, in situ in a continuous liquid phase, which is a solid-film-forming vehicle comprising the process step of subjecting to agitation a dispersion of (1) a first water insoluble organic synthetic resin forming component, as the dispersed phase, in (2) a liquid vehicle, as the continuous phase, such liquid vehicle being a solid-film-forming pigment binder and being substantially insoluble in such dispersed phase and vice versa at a temperature and for a time sufficient to effect in situ advancement of the condensation reaction and formation of the solid dispersed phase and usually cooling, during such process step the vehicle remaining substantially continuously liquid, as the continuous phase. In the preferred practice of this invention the organic synthetic resin forming component is used with a volatile liquid which enhances its thermofluidity. It is also preferred that said organic synthetic resin forming component contain sufficient aromatic components to make the methylol form of said resin component substantially insoluble in water.

For ease of reference, particularly in the subsequent examples, the vehicle formulation used will be referred p-toluenesulfonamide is heated with stirring to 90° C. until the solids are completely dispersed and the reaction mass appears to be homogeneous. Next, a charge of 42 grams of melamine is added with continued stirring and moderate additional heating to about 100° C. until the melamine is completely dispersed in the reaction mixture, at which time the resulting product X is cooled to room temperature.

The organic continuous phase vehicle X used is prepared by thoroughly admixing 10 grams of boiled linseed oil and 30 grams of previously described blend Y, together with 0.6 gram of Brilliant Yellow 6G base, 0.35 gram of Rhodamine B Extra and 0.16 gram of Rhodamine 6 GDN and the resulting vehicle X is added at room temperature to 60 grams of the product X in crushed form described in the previous paragraph in a conventional high speed disperser (sometimes identified in the trade as a high speed paint mill) operating at high speed (with heating up to 95° C.) to form a dispersion which is clear when smeared on a pane of glass. Once the dispersion (i.e. emulsion) has reached this degree of fineness or uniformity, a charge of 10 grams of boiled linseed oil and 5 grams of Inkol-O is added to the dispersion and the disperser is operated at high speed, heating the dispersion to about 150° C., where it is held until substantially all water is driven off from the dispersion, which is then cooled, to obtain a resulting dispersion X having substantially the characteristics already described in connection with the product of the initial run in Example 1 (except that the color is different because of the different proportions of the dye), being usable in printing inks, and the like and filming to produce a high gloss ink film of superior brightness.

EXAMPLE 3

A charge of 33 grams of water and 21.8 grams of 91% paraformaldehyde is thoroughly mixed to obtain uniformity at about 80° C. Then a charge of 75.2 grams of a mixture of o- and p-toluenesulfonamide is added, with stirring until thoroughly dispersed. Next, a charge of 1.4 grams of Brilliant Yellow 6G base (sometimes identified herein as "6G") is added and then thoroughly dispersed; and then a charge of 13.8 grams of melamine is added and the reaction mixture is stirred with heating up to about 100° C. until the melamine is completely dispersed, so as to obtain a product X.

A charge of 60 grams of the previously described blend Y and 20 grams of boiled linseed oil is heated together with stirring up to about 95° C., to form an organic continuous phase vehicle, at which stage the product X of the previous paragraph is added with high speed stirring continued at 95° C. until a thin film of the resulting dispersion, when smeared on a pane of glass, transmits light like a clear stained glass window. Next, a charge of 20 grams of boiled linseed oil, 0.32 gram of Rhodamine 6 GDN and 0.70 gram of Rhodamine B Extra is added to the dispersion with continued stirring until thoroughly dispersed, with a gradual increase in temperature up to about 150° C., where the dispersion is maintained with agitation until substantially all of the water of condensation and/or dehydration is driven off from the reaction material, which is then cooled to obtain a uniform dispersion X having substantially the same superior properties as those of the dispersion X obtained in Example 2 hereof.

EXAMPLE 4

A charge of 50 grams of water and 32.7 grams of 91% paraformaldehyde is thoroughly mixed at about 80° C. and then a charge of 112.8 grams of a mixture of o- and p-toluenesulfonamide is stirred into the mixture with continued heating until completely dispersed therein. A charge of 1.8 grams of Brilliant Yellow 6G base is then dispersed in the reaction mixture with continued stirring. Next, a charge of 20.7 grams of melamine is added to the reaction mixture with stirring and slight additional heating up to about 100° C., until the melamine is completely dispersed in the reaction mixture.

Next, a charge of 175 grams of a rotogravure ink vehicle consisting essentially of 28.6% styrenated alkyd copolymer resin (resin component of "Cycopol 341-17") and 71.4% VM and P naphtha is heated to approximately 95° C. and added to the product X of the previous paragraph in a conventional high speed disperser, which is operated at high speed (with slight heating up to about 100° C.) until a sufficiently uniform dispersion is obtained to pass the "smear test," i.e., a film thereof smeared on a pane of glass is capable of transmitting light like a clear stained glass window. Then a dye charge of 0.48 gram of Rhodamine 6 GDN and 1.05 grams of Rhodamine B Extra is added and thoroughly mixed into the dispersion, and the disperser is operated at high speed under reflux with a water trap, at which reflux temperature the violently agitated reaction mass is maintained until substantially all water is driven off therefrom, at which time the resulting product is cooled to obtain a dispersion X which has unusual uniformity in fineness of dispersed particles, such as is described hereinbefore, and which dispersion X in this case can be diluted with conventional ink solvents to produce a rotogravure ink having the viscosity desired.

EXAMPLE 5

A charge of 30 grams of water, 19.8 grams of 91% paraformaldehyde and 68.4 grams of a mixture of o- and p-toluenesulfonamide is heated with stirring up to about 85° C. until a complete and uniform dispersion of the ingredients is obtained, at which time a dye charge of 1.2 grams of Brilliant Yellow 6G base is thoroughly dispersed into the reaction mixture. Next, a charge of 12.6 grams of melamine is added with stirring and continued heating up to about 95° C. until the melamine is completely dispersed therein to obtain a resulting product X.

The continuous phase organic vehicle X is prepared by thoroughly mixing a charge of 40 grams of boiled linseed oil and 60 grams of the previously described blend Y and the resulting vehicle X is added to the product X of the previous paragraph in a conventional high speed disperser to obtain the desired clear emulsion, at approximately 90° C. At this time, a charge of 0.7 gram of Rhodamine B Extra and 0.32 gram of Rhodamine 6 GDN is dispersed in the dispersion and the disperser is operated at high speed, with heating up to approximately 150° C., at which temperature it is held until substantially all of the water of condensation is removed. The resulting dispersion is then cooled and found to have substantially the superior properties hereinbefore described in connection with dispersion X.

EXAMPLE 6

A charge of 30 grams of water, 19.8 grams of 91% paraformaldehyde, 68.4 grams of a mixture of o- and p-toluenesulfonamide, and 1.2 grams of Brilliant Yellow 6G base is thoroughly admixed, with stirring and heating up to 85° C. in order to obtain a complete dispersion of the ingredients. Then, a charge of 12.6 grams of melamine is added with continued stirring and heating up to about 100° C., until the melamine is thoroughly dispersed in the resulting product X.

A vehicle X prepared by thoroughly admixing 60 grams of the previously described blend Y and 20 grams of boiled linseed oil, is heated to about 95° C., and is then added to product X of the previous paragraph at about 95° C., in a conventional high speed disperser, which is operated until the resulting dispersion is sufficiently uniform to pass the previously described "smear test." To the resulting dispersion in the mill, at a temperature of about 95° C., a charge of 20 grams of boiled linseed oil, 10 grams of Inkol-O, 0.7 gram of Rhodamine B Extra, and 0.032 gram of Rhodamine 6GDN is added, and the disperser is then operated at high speed to effect violent agitation of the dispersion and heating up to about 150° C., at which temperature the reaction mixture is maintained until there is no longer any evidence of water being driven off. The resulting dispersion X is then cooled and found to possess the superior properties of dispersion X hereinbefore described.

EXAMPLE 7

A charge of 40 grams of water, 26.7 grams of 91% paraformaldehyde, 69.3 grams of a mixture of o- and p-toluenesulfonamide, and 1.5 grams of Brilliant Yellow 6G base is thoroughly admixed with continuous stirring at substantially 85° C.; and a charge of 17 grams of melamine is added with additional stirring, while the temperature is taken to and maintained at 95° C., until the melamine is completely dispersed in the reaction mixture.

An organic continuous phase vehicle X is prepared by admixing 30 grams of boiled linseed oil with 60 grams of previously described blend Y and heated to 95° C., to which vehicle X there is added the above product X at the 95° C. temperature described in a high speed disperser, which is operated at high speed (at about 95° C.) until a uniform emulsion is obtained which passes the previously described "smear test." Then, a dye charge of 0.7 gram of Rhodamine B Extra, 0.32 gram of Rhodamine 6GDN, plus an additional 20 grams of boiled linseed oil is added to the dispersion, and the stirring is maintained to effect violent agitation, with an increase in the temperature of the reaction mixture up to about 155° C., at which temperature the reaction mixture is held until the reaction is substantially completed (as evidenced by the termination of evolution of water of condensation). Resulting cooled dispersion X is found to have substantially the superior properties hereinbefore described.

EXAMPLE 8

A charge of 30 grams of water and 20.8 grams of 91% paraformaldehyde is heated with stirring to about 85° C. until the paraformaldehyde is completely dispersed; and a charge of 77 grams of a mixture of o- and p-toluenesulfonamide is then added and thoroughly dispersed in the reaction mixture. A charge of 1.5 grams of Brilliant Yellow 6G base is then thoroughly dispersed in the reaction mixture, and a charge of 11.4 grams of melamine is added to the reaction mixture with additional stirring and heating to a temperature of about 95° C., until the melamine is completely dispersed in the reaction mixture. The resulting product X is held at about 95° C. until its use, described in the next paragraph.

An organic vehicle X is prepared by thoroughly mixing a charge of 30 grams of boiled linseed oil and 60 grams of the previously described blend Y, and then an emulsion is formed in a conventional high speed disperser by adding product X of the previous paragragh at 95° C. to the instant vehicle X with high speed stirring to form an initial dispersion which is clear in the "smear test." Then a charge of 20 grams of boiled linseed oil, 0.7 gram of Rhodamine B Extra and 0.32 gram of Rhodamine 6GDN is added with stirring and the temperature is raised to 155° C., where it is held until the volatiles are no longer being driven off, and the resulting dispersion X is then cooled and found to have the superior properties hereinbefore described.

EXAMPLE 9

A charge of 35 grams of water, 23.1 grams of 91% paraformaldehyde, and 71.8 grams of a mixture of o- and p-toluenesulfonamide is heated with stirring to 85° C., at which time a charge of 1.5 grams of Brilliant Yellow 6G base is dispersed therein. Next, a charge of 17.6 grams of melamine is added to the reaction mixture with stirring and continued heating to 95° C. until the melamine is completely dispersed therein to obtain the resulting product X.

A charge of 60 grams of previously described blend Y and 30 grams of boiled linseed oil is thoroughly mixed to form vehicle X and the product X of the previous paragraph is added thereto, at 95° C., in a conventional high speed disperser, wherein an initial emulsion passing the smear test is formed at high speed, and a charge of an additional 10 grams of boiled linseed oil is added at 95° C. The temperature of the violently agitated dispersion rises to 145° C. and after substantial completion of the condensation reaction takes place, as evidenced by a discontinuance of foaming, a dye charge of 0.7 gram of Rhodamine B Extra and 0.32 gram of Rhodamine 6GDN is added, at 145° C., and the agitation is continued briefly with heating up to 150° C. After the red dyes have been thoroughly dispersed in the resulting reaction mixture, the material is cooled to obtain a dispersion X corresponding to the previously described products of the invention.

EXAMPLE 10

A charge of 30 grams of water, 21.8 grams of 91% paraformaldehyde, and 75.2 grams of a mixture of o- and p-toluenesulfonamide is thoroughly mixed with heating up to about 90° C. A charge of 13.8 grams of melamine is then added and stirring is continued up to 95° C., until the melamine is completely dispersed in the resulting product X.

A charge of 60 grams of previously described blend Y and 20 grams of boiled linseed oil is heated with stirring to obtain vehicle X, to which is added 1.2 grams of Brilliant Yellow 6G base, 0.7 gram of Rhodamine B Extra and 0.32 gram of Rhodamine 6 GDN, after which there is then added the product X of the previous paragraph at 95° C. with agitation at high speed in a conventional high speed disperser, until the resulting dispersion passes the smear test. Then, a charge of 20 grams of boiled linseed oil and 10 grams of Inkol–O is added to the dispersion in the disperser and the dispersion heated with stirring to about 145° C. over a 15 or 20 minute period, with evolution of water of condensation. The reaction mixture is held at about 145° C. until substantial completion of the condensation reaction is evidenced. The reaction mixture is cooled with agitation to obtain a resulting dispersion X having substantially the superior properties hereinbefore described.

EXAMPLE 11

A charge of 120 grams of water, 82.7 grams of 91% paraformaldehyde, and 300.8 grams of a mixture of o- and p-toluenesulfonamide is thoroughly mixed at about 95° C.; and then a charge of 55.2 grams of melamine is added with stirring and heating up to 100° C., until the melamine is completely dispersed in the resulting product X, which is cooled to a white appearing friable solid.

A charge of 142 grams of product X of the previous paragraph is melted at 95° C., is slowly added to and emulsified with vehicle X (obtained by first admixing a charge of 60 grams of previously described blend Y, 20 grams of boiled linseed oil, 1 gram of Brilliant Yellow 6G base, 2.0 grams of Rhodamine B Extra, and 0.84 gram of Rhodamine 6 GDN, and heating to 95° C.). The emulsion is agitated in a conventional high speed disperser, operating at high speed until the emulsion passes the previously described smear test, at which time a charge of 20 grams of boiled linseed oil and 10 grams of Inkol–O is added and, with agitation, the temperature is increased up to 145° C. over a period of about 15 or 20 minutes. The reaction mixture is maintained at 145° C. until condensation of the amine aldehyde resin (i.e. product X) is substantially completed, as evidenced by discontinuance of foaming, and the resulting reaction mixture is cooled to obtain a dispersion X having the superior properties hereinbefore described.

An ink formulation of superior properties, primarily because of the very fine pigment particle size therein is obtained by compounding a charge of 100 grams of dispersion X of the previous paragraph, 3 grams of calcium stearate, 2 grams of Inkol–O, 0.1 gram of cobalt octoate (12%), and 0.1 gram of eugenol, on a three roll ink mill until a uniform dispersion of the materials is obtained in the resulting ink product.

EXAMPLE 12

A charge of 60 grams of previously described blend Y, 20 grams of boiled linseed oil, 1 gram of Brilliant Yellow 6G base, 2 grams of Rhodamine B Extra and 0.84 gram of Rhodamine 6 GDN is thoroughly mixed to form vehicle X which is, in turn, dispersed with 142 grams of the product X of previous Example 11, at 95° C., in order to obtain an emulsion passing the smear test, while agitating at high speed in a conventional high speed disperser. Then a charge of 20 grams of Inkol–O is added, and the temperature caused to rise to 145° C. over a period of 15 to 20 minutes, at which temperature the reaction mass is agitated violently until the condensation reaction has apparently ended, and the resulting product is then cooled to a dispersion X having the superior properities hereinbefore described.

An ink product is obtained by milling and thoroughly dispersing on a three roll ink mill a charge of 30 grams of dispersion X described in the previous paragraph, 0.9 gram of calcium stearate, 0.9 gram of linseed oil, 0.9 gram of Inkol–O, 1 (approximately 0.03 gram) drop of cobalt octoate (12%) and 1 (approximately 0.03 gram) drop of eugenol. The resulting ink product is found to be capable of use for printing a very thin film of extremely bright color.

EXAMPLE 13

A portion of product X of Example 11 is cooled, pulverized and air dried, to eliminate free water, and to obtain a product X for this example which is in dry particulate form but is an amide-aldehyde resinous material that is not completely condensed.

A charge of 50 grams of the dry pulverized product X of the previous paragraph is added to a vehicle X at 95° C. in a conventional high speed disperser, such vehicle X being formed by thoroughly mixing a charge of 30 grams of previously described blend Y, 0.6 gram of Brilliant Yellow 6G base, 0.35 gram of Rhodamine B Extra and 0.16 gram of Rhodamine 6 GDN. The mixture of product X and vehicle X is agitated initially with high speed operation of the disperser until a uniform dispersion is obtained, at about 100° C., at which time a charge of 9 grams of boiled linseed oil and 4 grams of Inkol–O is added thereto and the resulting dispersion is agitated at high speed in the disperser while causing the temperature to rise to about 150° C. over a period of 15 to 20 minutes, and the reaction mixture is maintained at 150° C. until the condensation reaction appears to be substantially completed, as evidenced by discontinuance of foaming, and the material is then cooled with agitation to obtain a dispersion X which has the superior properties hereinbefore described resulting from the extremely fine particle size of the amide-aldehyde resin dispersed therein.

EXAMPLE 14

Vehicle X is prepared by thoroughly mixing and heating to 95° C. a charge of 60 grams of the previously described blend Y, 20 grams of boiled linseed oil, 1.4 grams of Brilliant Yellow 6G base, 0.095 gram of Rhodamine B Extra and 0.565 gram of Rhodamine 6GDN, which vehicle X is then dispersed into a charge of 100 grams of the product X of Example 11 heated to 95° C. in a conventional high speed disperser, operating at high speed, until a uniform dispersion is obtained, passing the smear test hereinbefore described, at which time a charge of 25 grams of Inkol–O and 1 gram of 2.3'-dihydroxy-4,4'-dimethoxybenzophenone ("Uvinul D–49", colorless absorber of ultraviolet in the range of 3000 to 4000 angstroms) is added and the resulting dispersion is subjected to agitation at high speed in the disperser and the temperature rises to about 145° C., at which temperature the reaction mixture is maintained until the condensation reaction is completed, at which time the material is cooled to obtain a resulting dispersion X having the superior properties hereinbefore described and having a pigment resin therein which contains an ultraviolet absorber so as to function to protect the dyes therein. As previously indicated, the Rhodamine dyes and the Uvinul in this case can also be added at about 145 or 150° C. as the dispersion is being agitated.

EXAMPLE 15

A charge of 100 grams of water, 100 grams of 91% paraformaldehyde and 171 grams of a mixture of o- and p-toluene-sulfonamide is thoroughly mixed and heated to 95° C. until the ingredients are completely dispersed. Then a charge of 187 grams of benzoguanamine is added with stirring and continued heating up to 100° C. until the benzoguanamine is completely dispersed in the reaction mixture; and the resulting product X is held briefly at 100° C. until it is used in the next step described in the next paragraph.

A charge of 60 grams of the previously described blend Y, 25 grams of boiled linseed oil, 2.1 grams of Brilliant Yellow 6G base and 0.32 gram of Rhodamine 6GDN is thoroughly mixed and warmed to about 95° C., at which time a charge of 124 grams of the product X of the previous paragraph, at 95° C., is added to vehicle X in a conventional high speed disperser, which is operated at high speed to obtain a completely uniform emulsion which passes the smear test previously described. At this time a charge of 25 grams of Inkol–O is added to the agitated dispersion, and heat is applied to raise the temperature of the dispersion from approximately 95° C. (prior to the adition of the Inkol–O charge) to about 150° C. over a period of 15 to 20 minutes, and the reaction mixture is held at 150° C. until all of the water is driven off. The resulting product is then cooled to obtain a dispersion X having the superior properties of the previously described dispersions, wherein the benzoguanamine type resin particles are found to be uniformly dispersed and in the form of generally spherical minutes particles in the size ranges hereinbefore described.

EXAMPLE 16

A charge of 120 grams of water, 132 grams of 91% paraformaldehyde and 171 grams of a mixture of o- and p-toluene-sulfonamide is stirred together with heating up to about 95° C. until a uniform dispersion of the ingredients is obtained, and a charge of 126 grams of melamine is then added with additional heating up to 100° C. and stirring until the melamine is completely dispersed therein to obtain the resulting product X.

A charge of 60 grams of the previously described blend Y, 20 grams of Inkol–O, 2.1 grams of Brilliant Yellow 6G base and 0.33 gram of Rhodamine 6GDN is then thoroughly mixed together and heated to 95° C. to obtain a vehicle X, to which is added a charge of 124 grams of the product X of the previous paragraph, while at 95° C., and the resulting mix is agitated at high speed in a conventional high speed disperser while maintained at 95° C. for 5 to 10 minnutes, in order to obtain a uniform dispersion, which passes the smear test hereinbefore described. Then a charge of 10 grams of Inkol–O and 20 grams of boiled linseed oil is added thereto and violent agitation is continued with heating up to 150° C. over a period of about 15 to 20 minutes, at which temperature the reaction mixture is maintained until substantially all of the water is driven off therefrom, at which time the material is cooled with stirring to obtain the resulting dispersion X which is found to posses the superior properties hereinbefore described.

EXAMPLE 17

A charge of 50 grams of water, 33 grams of 91% paraformaldehyde and 93.5 grams of benzoguanamine is stirred with heating up to 95° C. until the ingredients are completely dispersed therein, and the resulting product X is maintained briefly at 95° C. until used in the procedure of the next paragraph.

A charge of 60 grams of previously described blend Y, 20 grams of boiled linseed oil, 25 grams of Inkol–O and 4 grams of Brilliant Yellow 6G base is thoroughly mixed and heated to 95° C. to obtain vehicle X, to which is added the product X of the previous paragraph, at 95° C., and the material is agitated in a high speed disperser at 95° C. for 5 to 10 minutes in order to obtain a uniform dispersion that passes the smear test hereinbefore described. Then separate charges of 41 grams of 28% aqueous formalin and 10 grams of Inkol–O are added to the dispersion and with violent agitation continued the resulting dispersion is heated to about 140° C., at which temperature it is maintained until there is no longer evidence of water being driven off from the reaction mixture, which is then cooled to obtain a dispersion X having the superior properties hereinbefore described, with the benzoguanamine-formaldehyde resin particles dispersed in very fine discrete spherical particulate form and possessing bright color characteristics.

EXAMPLE 18

A charge of 15 grams of water, 0.08 gram of 70% aqueous phosphorous acid, 0.8 gram borax (decahydrate), 22.1 grams of 91% paraformaldehyde, and 51.3 grams of a mixture of o- and p-toluenesulfonamide is thoroughly mixed until substantially homogeneous at 95° C.; and then a charge of 12.6 grams of melamine is added with stirring and heating to about 100° C., until the melamine is completely dispersed, followed by heating up to 108° C. (over a period of 10 to 15 minutes) to drive off substantially all free water present. The resulting reaction product is then cooled, ground to a powder in a mortar, and then air dried for 5 days, to obtain a dry powdered product X.

An organic continuous phase vehicle X is prepared by admixing 187 grams of a 43.1% solids solution of a styrenated copolymer resin (resin component of Cycopol 341–17) in Magie Oil 535 and 80 grams of vehicle resin S. There is then added 50 grams of product X of the previous paragraph to 50 grams of said vehicle X at 95° C. in a conventional high speed disperser. The mixture of product X and vehicle X is agitated with high speed operation of the disperser until a uniform dispersion is obtained at about 100° C. There is then added 0.5 grams of Rhodamine B Extra and the resulting dispersion is agitated at high speed in the disperser (or high speed paint mill) causing the temperature to rise to about 150° C. over a period of 10 to 15 minutes. The material is then cooled to produce dispersion X. It is found that the resulting dispersion X has essentially the superior properties hereinbefore described in Example 13, including the extremely fine particle size of the amide-aldehyde resin dispersed therein, although careful examination indicates that the particle sizes (on an overall average) do not appear to possess the extreme fineness obtained, for example, in the procedures of Examples 1, 2 and/or 3 hereof. This is believed to be due to the fact that in Examples 1, 2 and/or 3 each product X initially dispersed in the vehicle X has some retained discernible amount of free water, whose presence evidently assists in effecting dispersion. It is also recognized that the instant Example 18 procedure, involving heating up to 108° C. during preparation of the initial incompletely condensed amide-aldehyde, should carry the condensation reaction (for effecting removal of combined water) at least somewhat farther than is done in Examples 1, 2, 3 or 13; but it is believed that such condensation reaction advances comparatively slowly at 108° C. as compared to the higher temperatures ordinarily employed in finalizing the condition of the dispersion X in the invention. On the other hand, the dispersed phase particle sizes obtained are substantially finer than they would be if the instant product X were instead reacted to effect substantial completion of the condensation reaction before being dispersed into the vehicle X as described in our application Ser. No. 70,927.

Also, if each of the various products X of Examples 1, 2, 3, 13 and 18 is added to ten times its volume of water, it is found that the dry products X of Examples 13 and 18, in particular, will soften somewhat indicating generally that such products X may be able to imbibe nominal amounts of water into their own solidified macromolecular condensate structure; but each such product X clearly retains its separate (solidified) phase in the substantial excess of water as evidence that the same is substantially water insoluble, even though it may inherently imbibe some water within what appears to be a substantially homogeneous condensate phase distinguishable from the separate phase of excess water (not imbibed thereby). The products X of Examples 1, 2 and 3 as well as others hereof are formed (as described) by heating initially to obtain a substantially homogeneous reaction mass (evidenced by visibly "clear" single-phase appearance). In its heated form (e.g. 95–100° C. approx.) such products X appear to be clear "syrups" which cool with increasing viscosity and, of course, will often solidify at room temperature; sometimes as a taffy-like resin, but other times the solidifying resin will exude water (as a second phase) upon cooling. Apparently, the water is retained in the substantially water insoluble resinous body (i.e. liquid, syrup or solid) functioning as a nonsolvent plasticizer (even though volatile). The tolerance for water which is technically the evident ability of each such resinous body to imbibe water into an apparently homogeneous (one-phase) system is greater at higher temperatures (e.g. syrups at 95–100° C.). No useful purpose is apparently served in using sufficient excess water to form an "apparent" second phase in product X. Except for varying tendencies among the various condensates hereof toward imbibing water in this manner, this is understood to be a characteristic inherent property of all of the products X of the examples hereof; and each of the products X hereof tested demonstrate such to be the case.

EXAMPLE 19

A procedure is carried out that is similar to that just described in Example 18, except that the amount of toluenesulfonamide used is equivalent to 2 mols instead of 3 mols and substantially the same results are obtained, except that a slight improvement in the dispersion and dispersed phase fineness appears to result. This may be because of the higher melamine to sulfonamide ratio in product X.

EXAMPLE 20

A charge of 50 grams of water and 25 grams of 91% paraformaldehyde is heated with stirring to obtain apparently complete solution of the formaldehyde at about 95° C., and then a charge of 93.5 grams of benzoguanamine is added with continued stirring and heating up to about 103° C. in order to obtain a complete dispersion of the benzoguanamine in the resulting product X.

The product X, at 95° C., is then thoroughly mixed into the vehicle X (consisting of 60 grams of the previously described Blend Y, 20 grams of boiled linseed oil and 4 grams of Brilliant Yellow 6G base) in a high speed disperser, in which the resulting dispersion is violently agitated at 95° C. for 5 to 10 minutes, so that the resulting dispersion passes the smear test hereinbefore described. Then, a charge of 35 grams of Inkol–O is added and the agitation is continued in the disperser with heating up to 150° C., at which temperature the reaction mass is maintained until substantially all water is driven off, and the resulting material is then cooled to obtain a dispersion X having properties comparable to those described for dispersion X hereinbefore, except, of course, the amide-aldehyde resin particles are benzoguanamine-formaldehyde resin particles which, in the dispersion X, are found to possess the same bright color and desirable optical properties.

EXAMPLE 21

A charge of 50 grams of water and 29.7 grams of 91% paraformaldehyde is heated with stirring at about 100° C. until the formaldehyde appears to be completely dispersed therein, at which time a charge of 84 grams of benzoguanamine is added with continued stirring and heating until the benzoguanamine appears to be completely dispersed in the resulting product X, which is then cooled to 95° C.

A charge of 60 grams of the previously described blend Y, 20 grams of boiled linseed oil, and 25 grams of Inkol–O, is stirred to 95° C., to obtain a uniform vehicle X, to which the product X of the previous paragraph, at 95° C., is added in the disperser, which is operated at high speed for about 5 to 10 minutes, at 95° C., in order to obtain a uniform dispersion which passes the smear test hereinbefore described. Then, the reaction mixture is heated to 150° C., over a period of 15 to 20 minutes, with continued agitation in order to drive off subsatntially all of the water, and the product is then cooled to obtain a dispersion X which is clear (i.e. undyed), but which contains discrete, uniformly dispersed very fine benzoquanamine-formaldehyde resin particles, which impart a glossy appearance to the resulting dispersion X when filmed and dried.

EXAMPLE 22

A charge of 25 grams of water, 33 grams of 91% paraformaldehyde, and 61.5 grams of a mixture of o- and p-toluenesulfonamide is heated to 85° C. with stirring until the ingredients are uniformly dispersed therein, and a charge of 22.7 grams of a melamine is then added with continued stirring and heating up to 95° C. in order to completely disperse the melamine in the resulting product X.

A charge of 60 grams of the previously described blend Y, 20 grams of boiled linseed oil, 1.2 grams of Brilliant Yellow 6G base, 0.6 gram of Rhodamine B Extra and 0.24 gram of Rhodamine 6GDN is stirred with nominal heating up to about 90° C. to obtain a uniform vehicle X, to which the product X of the previous paragraph is added, at 95° C., in a disperser, and the resulting reaction mixture is agitated at high speed in the disperser for 5 to 10 minutes at 95° C. in order to obtain a uniform dispersion which passes the previously described smear test. A charge of 20 grams of Inkol–O is then added, with continued agitation. It is found that the resulting dispersion has many of the essential advantageous properties of the dispersions X hereinbefore described. The dispersion is heated with continued agitation in the disperser up to about 150° C. for a sufficient time to permit the water to be volatilized. Condensation of the resin will also be further advanced in this procedure, so that when the resulting material is cooled to obtain a dispersion X, the discrete amide-aldehyde resin products carrying the dye have undergone substantial condensation.

Depending upon the components of product X, and the degree of condensation desired, it must be pointed out that the dispersion can be removed from the disperser at any time after the dispersion passes the smear test. Thus the dispersion may still contain a certain amount of water in the dispersed phase and the resin may not have undergone complete condensation. The dispersion in this condition, however, can be filmed to obtain a brightly colored dried product, which can be subjected briefly to heat to further advance the condensation of the discrete resin particles and/or accelerate removal of the water, if such is desired.

EXAMPLE 23

A charge of 25 grams of water, 34 grams of 91% paraformaldehyde, and 46.2 grams of a mixture of o- and p-toluenesulfonamide is heated with stirring to about 90° C. to obtain a uniform dispersion of the ingredients, to which a charge of 34 grams of melamine is then added with continued stirring until a uniform dispersion is obtained in the resulting product X, which is allowed to cool to room temperature.

A charge of 90 grams of the previously described blend Y, 13 grams of the previously described vehicle resin S, 15 grams of Inkol–O, 1.2 grams of Brilliant Yellow 6G base, 0.6 gram of Rhodamine B Extra and 0.24 gram of Rhodamine 6GDN is heated with stirring to about 80° C. in order to obtain a uniform vehicle X, to which the product X of the previous paragraph is added in a disperser with agitation at a temperature of about 80° C. in order to obtain a uniform emulsion which passes the smear test hereinbefore described. Next, a charge of 10 grams of Inkol–O and 10 grams of the previously described vehicle resin S is added to the reaction mixture with continued stirring, at 80° C. The resulting dispersion is then warmed with continued agitation up to 130° C., at which temperature an additional charge of 10 grams of Inkol–O is added and the agitation is continued up to 150° C., where the reaction mixture is held until substantially all of the water is driven off, and then, just before permitting the material to cool, three drops (0.24 gram) of 70% aqueous phosphorous acid is added and thoroughly mixed into the reaction mixture at 150° C., and the material is then cooled to obtain dispersion X which has the superior properties hereinbefore described.

EXAMPLE 24

A charge of 25 grams of water, 1 gram of borax (decahydrate), 46.2 grams of a mixture of o- and p-toluenesulfonamide and 34 grams of 91% paraformaldehyde is stirred with heating up to 95° C. to obtain a complete dispersion of the ingredients, and then a charge of 34 grams of melamine is added with continued stirring at 95° C. until the melamine is completely dispersed in the resulting product X.

A charge of 40 grams of the previously described vehicle resin S, 57 grams of the previously described blend Y, 1 gram of Brilliant Yellow 6G base, 1 gram of Rhodamine B Extra, 0.42 gram of Rhodamine 6GDN, and 30 grams of Inkol–O is heated to 75° C. and mixed thoroughly in a disperser to obtain a uniform, homogeneous vehicle X, to which is added the product X of the previous paragraph at 95° C., and the disperser is operated at high speed to effect the formation of a uniform emulsion at 95° C. After such agitation at 95°C. for about 10 minutes (at which time the dispersion is clear enough to pass the smear test), the resulting dispersion is heated to about 155° C. and held there for about 10 minutes, with continued agitation, until the water has all apparently been driven off and the resulting material is then cooled with agitation to obtain dispersion X which has the superior properties hereinbefore described characterized by the extremely fine particle size of the dyed amide-aldehyde resin dispersed therein.

EXAMPLE 25

A charge of 10 grams of water, 1.4 grams of borax (decahydrate), 16.7 grams of 91% paraformaldehyde, and 54 grams of a mixture of o- and p-toluenesulfonamide is heated and mixed in order to obtain a uniform dispersion at about 95° C. A charge of 8 grams of melamine is then added with continued stirring and with heat to maintain a temperature of 100° C. for about 10 minutes, at which time the melamine appears to be completely dispersed, giving the resulting product X.

A charge of 45 grams of the previously described blend Y, 15 grams of the previosuly described vehicle resin S, 0.90 gram of Brilliant Yellow 6G bases and 5 grams of Inkol–O is then heated to 90° C. and mixed to obtain a uniform vehicle X to which is added the product X of the previous paragraph, and the resulting composition is agitation and held there until all of the water is apparent-minutes to obtain a uniform dispersion, which passes the smear test hereinbefore described. The resulting dispersion is then heated to 180° C. with continued violent agitation and held there until all of the water is apperently completely removed, at which time the material is cooled to 150° C., with agitation continued, and a charge of 0.67 gram of Rhodamine B Extra, 0.3 gram of Rhodamine 6GDN and 2 drops of 70% aqueous phosphorous acid is added with agitation continuing until the dyes and phosphorous acid are completely dispersed in the reaction mixture, which is then cooled to room temperature to obtain a dispersion X wherein the amide-aldehyde resin particles are again in the form of extremely minute spherical particles within the size range hereinbefore described, and the dyes have apparently migrated substantially entirely to such amide-aldehyde resin particles in the dispersion X.

EXAMPLE 26

A charge of 10 grams of water, 1.4 grams of borax (decahydrate), 2 drops of 70% aqueous phosphorous acid, 16.7 grams of 91% paraformaldehyde, and 54 grams of a mixture of o- and p-toluenesulfonamide is stirred with heating up to about 100° C. until the ingredients are dispersed uniformly therein, at which time a charge of 8 grams of melamine is added and with continued stirring the reaction mixture is heated to 100° C. to obtain uniform dispersion of the melamine in the resulting product X. 0.675 gram of Rhodamine 6GDN is then stirred into the product X at 100° C., with stirring for about 10 minutes at this temperature.

Then, vehicle X formed by thoroughly mixing a charge of 10 grams of Inkol-O, 45 grams of previously described blend Y, and 15 grams of previously described vehicle resin S is added to the product X of the previous paragraph being held at 100° C., in a disperser, wherein the materials are agitated at 95° C. for about 10 minutes to obtain a uniform dispersion that passes the smear test. The dispersion is then heated with continued agitation up to 155° C., at which temperature it is held until the water is substantially removed from the reaction mixture, and the material is then cooled to obtain dispersion X having the superior properties and characteristics hereinbefore described.

EXAMPLE 27

A charge of 15 grams of water, 1.5 grams of borax (decahydrate), 2 drops of 70% aqueous phosphorous acid, 0.53 gram of Rhodamine B Extra, 0.6 gram of Brilliant Yellow 6G base and 0.26 gram of Rhodamine 6GDN is heated to about 90° C. and mixed thoroughly to uniformly disperse the ingredients, and to this is added a charge of 17.6 grams of 91% paraformaldehyde, which is stirred in to obtain a uniform dispersion. Next, a charge of 54.7 grams of a mixture of o- and p-toluenesulfonamide is thoroughly dispersed in the reaction mixture, and this is followed by the addition of a charge of 10 grams of melamine, and the resulting reaction mixture is stirred with heating up to 100° C. until the melamine is completely dispersed therein to obtain the resulting product X.

A charge of 24 grams of Inkol-O and 45 grams of oil-soluble, heat-reactive phenolic resin (sold under the trade name "Bakelite CKR 1634") is cooked for one hour at 175° C., and the Inkol-O solvent lost during such cooking is replaced to obtain a resulting phenolic vehicle resin P. A charge of 23 grams of such phenolic vehicle resin P, 45 grams of previously described blend Y, and 5 grams of Inkol-O is then thoroughly mixed and heated to 100° C. to obtain a vehicle X, to which is then added the product X of the previous paragraph, at 100° C., in the disperser, which is then operated at high speed to obtain a substantially uniform dispersion at 100° C. The dispersion thus prepared passes the smear test, and is heated to 150° C. with continued violet agitation, and then cooled to obtain a dispersion X having the superior properties characterized by the extremely fine particle size of the dye bearing amide-aldehyde resin particles dispersed therein.

EXAMPLE 28

A charge of 15 grams of water, 1.5 grams of borax (decahydrate), 2 drops of 70% aqueous phosphorous acid and 17 grams of 91% paraformaldehyde is stirred to obtain a uniform reaction mixture at 90° C.; and a charge of 57 grams of a mixture of o- and p-toluenesulfonamide is then thoroughly dispersed therein. Next, a charge of 8.4 grams of melamine is added, with continued stirring and heating to 100° C. until the melamine is completely dispersed therein to form product X.

A charge of 45 grams of the previously described blend Y, 15 grams of the previosuly described vehicle resin S and 10 grams of Inkol-O is then thoroughly mixed to obtain a vehicle X at approximately room temperature, which is then added to the product X of the previous paragraph, while at 100° C., and the resulting mixture is agitated violently in the disperser with heating up to 165° C., until all of the water is apparently driven off. Then, a charge of 2.25 grams of Rhodamine dye paste Y is added with continued agitation to effect dispersion thereof and followed by cooling back down to room temperature to obtain a dispersion X in which the characteristic features of the extremely minute discrete dispersion of dyed amide-aldehyde resin particles are apparent, as previously described herein.

EXAMPLE 29

A charge of 15 grams of water, 1.5 grams of borax (decahydrate), 2 drops of 70% aqueous phosphorous acid and 3 grams of Brilliant Yellow 6G base is first thoroughly mixed at about 90° C. Then, a charge of 20.7 grams of 91% paraformaldehyde, followed by 44.3 grams of a mixture of o- and p-toluenesulfonamide, then by 10.9 grams of melamine and finally 7.4 grams of ethylene urea are added to the reaction mixture with continued stirring and heating up to 100° C. until a uniform dispersion is obtained in the resulting product X.

A charge of 45 grams of previously described blend Y, 15 grams of previously described vehicle resin S and 10 grams of Inkol-O is mixed together to provide a vehicle X at about room temperature which is added to the product X of the previous paragraph at 100° C. in the disperser and subjected to agitation therein and heating up to 165° C. until all of the water has been driven off, the resulting material is then cooled with continued agitation and addition of Inkol-O lost during the procedure to obtain a dispersion X of the type hereinbefore described.

EXAMPLE 30

A procedure is carried out that is the same as that described in Example 29, except that the product X is formed by initially admixing a charge of 15 grams of water, 1.5 grams of borax (decahydrate), 2 drops of 70% aqueous phosphorous acid, and 3.7 grams of Brilliant Yellow 6G base. Then 18.5 grams of 91% paraformaldehyde is added, followed by 50.2 grams of a mixture of o- and p-toluenesulfonamide, then 9.2 grams of melamine, and then 6.3 grams of ethylene urea with stirring and heating of the reaction mixture up to 100° C., in order to obtain a uniform dispersion as the product X.

The resulting dispersion X is found to have the same advantageous properties that are obtained in the procedure of Example 29 and which have been described hereinbefore.

EXAMPLE 31

A charge of 15 grams of water, 1.5 grams of borax (decahydrate), 2 drops of 70% aqueous phosphorous acid and 3.75 grams of Brilliant Yellow 6G base is first prepared in the form of a uniform dispersion at about 90° C. to which is added a charge of 19.4 grams of 91% paraformaldehyde. Next, a charge of 45.2 grams of a mixture of o- and p-toluenesulfonamide is thoroughly dispersed in the reaction mixture and this is followed by stirring in and thoroughly dispersing a charge of 11.1 grams of melamine. Next, a charge of 7.6 grams of ethylene urea is thoroughly dispersed in the reaction mixture, which is heated to 100° C. with stirring to complete such dispersion and to obtain the resulting product X.

A charge of 37 grams of previously described blend Y, 20 grams of previously described vehicle resin S and 20 grams of Inkol–O is then thoroughly mixed to obtain a vehicle X, at room temperature, which is added to the product X of the previous paragraph, at 100° C., in the disperser and the resulting mixture is subjected to agitation at high speed in the disperser plus heating up to 165° C. to substantially drive off water in the reaction system, and the resulting reaction mass is then cooled with agitation (and with replacement of solvent lost by evaporation) to room temperature to obtain a dispersion X having the properties previously described herein.

EXAMPLE 32

Product X is prepared from 15 grams of water, 1.5 grams of borax (decahydrate), 2 drops of 70% aqueous phosphorous acid, 19 grams of 91% paraformaldehyde, 51.3 grams of a mixture of o- and p-toluenesulfonamide, and 12.6 grams of melamine, which materials are successively added to the reaction mixture and dispersed therein, followed by the addition of a dye charge of 0.75 gram of Brilliant Yellow 6G base and 0.45 gram of Rhodamine B Extra, stirred into the product X at 100° C.

Vehicle X is prepared at room temperature by admixing 40 grams of previously described blend Y, 18 grams of previously described vehicle resin S and 20 grams of Inkol–O, and vehicle X is then added to product X of the previous paragraph at 100° C. and the resulting mixture is initially dispersed in the disperser with agitation at 95° C., and then heated up to 145° C. to substantially drive off water, after which a charge of 1.8 grams of Rhodamine dye paste Y (previously described) is thoroughly dispersed in the agitated dispersion at 145° C., and the dispersion is then taken up to 155° C. briefly and cooled to obtain a dispersion X having the properties hereinbefore described. In this procedure and in the various other procedures described herein, it will be appreciated that solvent losses, e.g. Inkol–O losses in the instant example are replaced while agitation is being carried on in the disperser but during cooling.

EXAMPLE 33

Product X is prepared using the previously described procedure from 15 grams of water, 1.5 grams of borax (decahydrate), 2 drops of 70% aqueous phosphorous acid, 17.6 grams of 91% paraformaldehyde, 54.9 grams of a mixture of o- and p-toluenesulfonamide, and 10 grams of melamine, with each of the ingredients being added in succession and thoroughly dispersed in the reaction mixture at about 100° C., followed by the dispersion of a dye charge of 0.75 gram of Brilliant Yellow 6G base and 0.45 gram of Rhodamine B Extra to produce a dyed product X.

Vehicle X is prepared by blending 27 grams of previously described blend Y, 12 grams of previously described vehicle resin S, and 20 grams of Inkol–O at approximately room temperature and adding the resulting vehicle X to the product X of the previous paragraph at 100° C. in the disperser, followed by agitation first at 95° C. and then heating on up to 145° C. to substantially remove the water while the agitation is continued in the disperser. Then, a charge of 1.8 grams Rhodamine dye paste Y is thoroughly dispersed in the agitated reaction mixture at 145° C. Also, a charge of 12 grams of previously described phenolic vehicle resin P is dispersed in the agitated reaction mixture at 145° C., and the composition is then heated up to 150° C. with continued agitation, briefly, and then permitted to cool to room temperature, again with addition of Inkol–O lost by evaporation during the procedure, so as to obtain a resulting dispersion X having the characteristic properties of the compositions of the invention hereinbefore described.

EXAMPLE 34

Product X is prepared by forming a uniform dispersion in accordance with the procedures described in Examples 32 and 33 from 15 grams of water, 1.5 grams of borax (decahydrate), 2 drops of 70% aqueous phosphorous acid, 21.3 grams of 91% paraformaldehyde, 46 grams of a mixture of o- and p-toluenesulfonamide, 17 grams of melamine, 0.75 grams of Brilliant Yellow 6G base and 0.45 gram of Rhodamine B Extra.

Vehicle X is prepared by blending at room temperature 37 grams of previously described blend Y, 20 grams of vehicle resin S and 20 grams of Inkol-O and the resulting vehicle X is added at room temperature to produce X obtained in the previous paragraph, at 100° C., in the disperser, with agitation and heating first up to 95° C. to obtain a uniform dispersion, and then with continued agitation and heating up to 145° C. of drive off substantially all of the water. At 145° C. 1.8 grams of Rhodamine dye paste Y (previously described) is thoroughly dispersed in the agitated reaction mix, while held at 145° C., and then the reaction mixture is heated briefly to 155° C. and then cooled to room temperature to obtain a dispersion X having the advantageous properties of the invention already described herein.

EXAMPLE 35

Product X is prepared using the procedure described in previous Examples 32, 33 and 34 from 15 grams of water, 1.5 grams of borax (decahydrate), 2 drops of 70% aqueous phosphorous acid, 22.1 grams of 91% paraformaldehyde, 51.3 grams of a mixture of o- and p-toluenesulfonamide, 12.6 grams of melamide, 0.75 gram of Brilliant Yellow 6G base and 0.525 gram of Rhodamine B Extra, again being heated to 100° C. in order to obtain the final uniform dispersion of product X.

Vehicle X is prepared by blending together 40 grams of the previously described blend Y, 18 grams of the previously described vehicle resin S, and 20 grams of Inkol–O, to obtain a uniform vehicle X at room temperature, which is added to product X of the previous paragraph, at 100° C., in the disperser and an initial uniform dispersion is obtained by agitation at about 95° C. The resulting dispersion is then heated up to 145° C. with continued violent agitation and at 145° C. 1.57 grams of the Rhodamine dye paste Y is then thoroughly dispersed in the reaction mixture, and the reaction mixture is taken up to 155° C. briefly with continued agitation and then cooled to room temperature to obtain a dispersion X having the properties of the invention.

EXAMPLE 36

Product X is obtained in the manner described in connection with Examples 32 through 35 hereof from 15 grams of water, 1.5 grams of borax (decahydrate), 2 drops of 70% aqueous phosphorous acid, 22.1 grams of 91% paraformaldehyde, 51.3 grams of a mixture of o- and p-toluenesulfonamide, 12.6 grams of melamine, 0.75 gram of Brilliant Yellow 6G base and 0.525 gram of Rhodamine B Extra, with stirring at a temperature of about 100° C. to obtain product X.

Vehicle X is prepared by blending together 20 grams of previously described blend Y, 18 grams of previously described vehicle resin S, and 30 grams of pale "H" linseed oil, at room temperature, and vehicle X thus prepared is added to product X of the previous paragraph, at 100° C., in the disperser and agitation effect the formation of a uniform dispersion therefrom at 95° C. The resulting dispersion is then heated up to 145° C. with continued agitation until all of the water is driven off, at which time 1.57 grams of the Rhodamine dye paste Y is dispersed in the dispersion and agitation is continued with heating briefly to 155° C. and then cooling to room temperature to obtain dispersion X having the properties hereinbefore described.

EXAMPLE 37

Product X is prepared in accordance with the procedures of Examples 32 through 36 hereof using 15 grams of water, 1.5 grams of borax (decahydrate), 25.2 grams of 91% paraformaldehyde, 34.2 grams of a mixture of o- and p-toluene sulfonamide, 25.2 grams of melamine and 3.75 grams of Brilliant Yellow 6G base, which product X is heated with stirring to about 100° C. to obtain the complete dispersion of product X.

Vehicle X is prepared by blending together 20 grams of previously described blend Y, 15 grams of previously described vehicle resin S, and 25 grams of pale "H" linseed oil, at room temperature, and the resulting vehicle X is then added to product X of this example, at 100° C., in the dispenser. Initial agitation with heating is carried out at about 95° C. in order to obtain a uniform emulsion, which is then heated with continued agitation to 155° C. and cooled to room temperature to obtain a dispersion X having the properties hereinbefore described.

EXAMPLE 38

Using the procedure of the previous Examples 32 through 37, product X is prepared from 15 grams of water, 1.5 grams of borax (decahydrate), 22.1 grams of 91% paraformaldehyde, 51.3 grams of a mixture of o- and p-toluenesulfonamide, 12.6 grams of melamine, and 4.5 grams of Brilliant Yellow 6G base to obtain the resulting uniform product X at about 100° C.

Vehicle X is obtained by blending together 45 grams of previously described blend Y, 25 grams of previously described vehicle resin S, 5 grams of Inkol-O, and 23.5 grams of pale "H" linseed oil. The resulting vehicle X at room temperature is added to product X of the previous paragraph at 100° C. in the disperser and the reaction mixture is then violently agitated and heated to 95° C. to obtain a uniform dispersion, which is then heated on up to 150° C. with continued agitation to drive off the water. Then with continued violent agitation, a charge of 5 grams of low molecular weight polyethylene polymer (AC–6) is dispersed into the reaction mixture. Such polymer is commercially available and has a molecular weight of substantially 2000, a melting or softening point of substantially 219–226° F., a specific gravity of 0.92, and an average viscosity at about 140° C. of 180 centipoises. The resulting material is then cooled to room temperature with continued agitation to obtain a dispersion X having the properties hereinbefore described.

EXAMPLE 39

Product X is prepared in the manner hereinbefore described in the examples of the 30 series hereof using 15 grams of water, 1.5 grams of borax (decahydrate), 2 drops of 70% aqueous phosphorous acid, 22.1 grams of 91% paraformaldehyde, 51.3 grams of a mixture of o- and p-toluenesulfonamide, 12.6 grams of melamine, 1.875 grams of Brilliant Yellow 6G base, and 0.375 gram of Rhodamine B Extra, the resulting product X being heated to 100° C. to effect the complete dispersion of the ingredients.

Vehicle X is prepared by blending together at room temperature 45 grams of previously described blend Y, 25 grams of previously described vehicle resin S, 5 grams of Inkol-O, and 23.5 grams of pale "H" linseed oil. Vehicle X at room temperature is added to product X of the previous paragraph at 100° C. and the resulting reaction mixture is dispersed by violent agitation in the disperser at 95° C., initially, and then with continued heating up to 125° C., at which temperature a charge of 2.7 grams of Rhodamine dye paste Y is thoroughly dispersed in the agitated dispersion. Also, at 125° C. a charge of 5 grams of previously described low molecular weight polyethylene polymer (AC–6) is dispersed in the emulsion, and the agitation is continued with heating up to 150° C., then followed by cooling to obtain the resulting dispersion X having the properties of the invention hereinbefore described.

EXAMPLE 40

Product X is prepared using the procedure of the 30 series of examples, using 20 grams of water, 1.5 grams of borax (decahydrate), 2 drops of 70% aqueous phosphorous acid, 22.1 grams of 91% paraformaldehyde, 51.3 grams of a mixture of o- and p-toluenesulfonamide, 12.6 grams of melamine and 3.375 grams of Brilliant Yellow 6G base.

Vehicle X is prepared by blending together 45 grams of previously described blend Y, 23.2 grams of previously described vehicle resin S, and 0.3 gram of pale "H" linseed oil; and vehicle X at room temperature is added to product X of the previous paragraph at 100° C. in the disperser and the resulting reaction mixture is dispersed by violent high speed agitation in the disperser, initially at 95° C. Then at 104° C. a charge of 0.375 gram of Rhodamine B Extra is dispersed in the dispersion with continued agitation and the resulting dispersion is heated to 125° C., at which temperature a charge of 4.05 grams of the Rhodamine dye paste Y is dispersed in the dispersion with 5 grams of the polyethylene polymer (AC–6), and the dispersion is heated to 150° C. and then cooled to obtain dispersion X of the invention.

EXAMPLE 41

Product X is prepared as described in previous Example 40, and to this is added 76.1 grams of vehicle X having the composition of 45 grams of blend Y, 23.8 grams of vehicle resin S and 9.5 grams of pale "H" linseed oil in the disperser to obtain an initial dispersion at 95° C., and the agitation is continued with heating up to 104° C., at which temperature a charge of 0.075 gram of Rhodamine B Extra is dispersed in the agitated dispersion. The material is then heated with continued agitation up to 125° C., at which temperature a charge of 2.7 grams of the Rhodamine dye paste Y and 5 grams of the polyethylene polymer (AC–6) is thoroughly admixed in the dispersion and with continued agitation the dispersion is taken up to 150° C., at which temperature the water is completely driven off and the resulting material is cooled to room temperature with agitation, to obtain the dispersion X of the invention.

EXAMPLE 42

Product X is prepared using the procedure of Example 40 for product X, except that the Brilliant Yellow 6G base dye charge is 0.75 gram instead of 3.75 grams.

Vehicle X is prepared by blending together 1.5 grams of vehicle blend Y and 77.5 grams of vehicle blend Z (i.e. a blend of 45 grams of previously described blend Y, 25 grams of previously described vehicle resin S, and 10 grams of pale "H" linseed oil). The vehicle X is added to the product X of the previous paragraph, at 100° C., and the resulting mixture is dispersed in the disperser initially at 95° C. and then with continued agitation heated to 105° C., at which temperature a dye charge of 0.45 gram of Rhodamine B Extra is dispersed therein; and the dispersion is heated up to 125° C. At 125° C. there is dispersed in the dispersion with continued violent agitation 1.8 grams of Rhodamine dye paste Y and 5 grams of the polyethylene polymer (AC–6) and the resulting reaction mixture is then taken up to and held at 135 to 140° C. for about 15 minutes to complete the substantial removal of water and cooled to room temperature (with replacement of Inkol-O losses during heating) to obtain a dispersion X of the invention.

EXAMPLE 43

Product X is prepared by carrying out the procedure of Example 38 for the preparation of product X therein, but the dyestuff and phosphorous acid are eliminated.

Vehicle X is prepared by blending together 80 grams of previously described blend Z, 13.5 grams of pale "H" linseed oil, and 7.5 grams of an ultraviolet absorber commercially available under the trade name "Tinuvin P" (Geigy Chem., understood to be a benzotriazole derivative, e.g., alkylated 2-hydrophenyl-benzotriazole). The resulting vehicle X is added to product X of the previous paragraph at 100° C. in the dispersed and the reaction mixture is dispersed with agitation and heated to 150° C. to substantially remove water in the system, 5 grams of previously described low molecular weight polyethylene polymer (AC-6) are added and after dispersion the reaction mixture is then cooled to obtain dispersion X of the invention. Again, the solvent loss can be replaced with Inkol–O in the dispersion.

EXAMPLE 44

A charge of 25 grams of water, 1 gram of borax (decahydrate), and 2 drops (approximately 0.16 gram) of 70% aqueous phosphorus acid is heated to about 90° C. and there is then added, successively with stirring, 27.2 grams of 91% paraformaldehyde, 171 grams of a mixture of o- and p-toluenesulfonamide, 18.1 grams melamine, 13.5 grams phenol and 0.6 gram Rhodamine B Extra to form product X (a homogeneous mixture).

Then, 74 grams of vehicle X (prepared by blending together 38.1 parts of vehicle blend Y, 50.3 parts of vehicle resin S, and 11.5 parts of Inkol–O) is added with agitation to product X at about 100° C. The temperature is increased with continued agitation. At 135° C. there is added 1.8 grams of Rhodamine 6 GDN dye paste Y. Heating is continued to 140° C. and dispersion X of the invention is cooled to room temperature. Solvent lost during the heating may be replaced by Inkol–O.

EXAMPLE 45

A charge of 20 grams of water, 1 gram of borax (decahydrate) and 2 drops of 70% aqueous phosphorus acid is heated to about 90° C. and then 20.2 grams of (91%) paraformaldehyde, 10.1 grams of urea, and 57.5 grams of a mixture of o- and p-toluenesulfonamide are added successively with stirring and continued heating to 100° C. to obtain a substantially uniform product X.

To the above product X there is added 80 grams of a vehicle (which is about 60% solids of 28% vinyl toluene modified alkyl resin in Magie Oil 535), followed by 0.75 gram of Rhodamine B Extra, with agitation to obtain a substantially uniform dispersion. Then, with continued stirring and heating up to 150° C. there is added at this temperature sufficient Magie Oil 535 to replace solvent losses during heating, and the dispersion is cooled to room temperature to obtain dispersion X, which the superior properties hereinbefore described.

EXAMPLE 46

A charge of 35 grams of water, 1.5 grams of borax (decahydrate), 2 drops of 70% aqueous phosphorus acid, and 3.8 grams of Neozapan Fiery Red G is prepared. To the resulting reaction mixture is added 22.1 grams of 91% paraformaldehyde, and then 51.3 grams of a mixture of o- and p-toluenesulfonamide is dispersed in the reaction mixture. Next, a charge of 12.6 grams of melamine is dispersed in the reaction mixture with heating up to about 100° C. to obtain the resulting product X.

The product X and 80 grams of vehicle X (vehicle blend Z) are then admixed by adding the vehicle to the product in a dispenser, and the resulting material is dispersed by agitation, with heating up to about 105° C., at which temperature an additional charge of 13.5 grams of pale "H" linseed oil is dispersed in the reaction mixture. The agitation is continued with heating up to 130° C., at which temperature a charge of 5 grams of the previously described low molecular weight polyethylene polymer (AC-6) as added, and the reaction mixture is heated on up to 145° C. and held there with agitation until the water is substantially driven off, at which time the reaction mix is cooled to obtain dispersion X of the invention. It will be understood that the instant dispersion X contains a non-fluorescent red dye.

A corresponding embodiment of the invention in the form of a dispersion X having a non-fluorescent blue color is obtained by carrying out the procedure of the instant Example 46, as described herein, except that the Neozapan Fiery Red G is replaced by 7.5 grams of Neozapan Blue FLE #1989C.

EXAMPLE 47

An ink formulation embodying the instant invention is prepared by thoroughly milling on a three roll ink mill, using conventional ink formulating practice, a charge of 98.1 grams of the dispersion X of Example 39, 1.3 grams of lead-manganese paste drier (i.e. 11.75% lead and 2.23% manganese), 0.3 gram of 12% cobalt octoate, and 0.3 gram of eugenol (anti-skinning agent). The resulting product was found to have unusual superiority as an ink formulation, particularly for the use of the same in very thin films, because of the unique superiority of the extremely minute sized particles of pigment therein.

Another ink formulation of superior characteristics is obtained by milling on a three roll ink mill, in conventional ink formulating practice, a charge of 90.65 grams of the dispersion X of Example 40 hereof, 5.8 grams of boiled linseed oil, 0.4 gram of 12% cobalt octoate, 3.0 grams of previously described lead-manganese paste and 0.15 gram of eugenol.

In either of the ink formulations of the instant Example, the tack is increased by milling into the formulation 9 grams of the previously described vehicle resin S, or in the second ink formulation hereof, the tack may be increased by replacing the boiled linseed oil with an equivalent amount of the previously described vehicle resin S.

EXAMPLE 48

Another ink formulation embodying the instant invention is prepared in a three roll ink mill, using conventional ink formulating practice, from a charge consisting of 90 grams of the dispersion X of Example 42 hereof, 6.5 grams of Inkol–O, 3 grams of the previously described lead-manganese paste drier, 0.4 gram of 12% cobalt octoate, and 0.15 gram of eugenol. The resulting ink formulation has a desired low tack for certain uses, and the tack may be lowered additionally by milling additional Inkol–O into the above formulation, or by replacing a portion of the vehicle resin S that was used in the preparation of dispersion X of Example 42 with Inkol–O.

EXAMPLE 49

An additional ink formulation embodying the instant invention is prepared by milling on a three roll ink mill a charge of 82.35 grams of the dispersion X of Example 41, 10.46 grams of previously described vehicle resin S, 3.8 grams of Madras Orange, 2.85 grams of the previously described lead-manganese paste drier, 0.39 gram of 12% cobalt octoate and 0.15 gram of eugenol. The resulting ink formulation is a semi-fluorescent, high-tack ink formulation of superior utility because of the very fine particle size of the pigment therein.

EXAMPLE 50

Another ink formulation embodying the instant invention is prepared by milling on a three roll ink mill a charge of 96.45 grams of the red dispersion X of Example 46, 3.0 grams of the previously described lead-manganese paste drier, 0.4 gram of 12% cobalt octoate and 0.15 gram of eugenol. The resulting red ink product has the improved properties of the invention resulting primarily from the character of the very fine particle size of the pigment.

The corresponding blue ink of the invention is prepared using the procedure of the previous paragraph, but using the blue dispersion X described in Example 46.

The invention may also be used to prepare a process ink series, involving the preparation of pigments of the three primary colors using thermoplastic or thermoset resins in the ultimately formed dispersion X.

EXAMPLE 51

In the formation of a series believed to be thermoset, a charge of 35 grams of water, 1.5 grams of borax (decahydrate) and 2 drops of 70% aqueous phosphorous acid is heated up to 90° C. with stirring; and a charge of 24.7 grams of formaldehyde, in the form of 91% paraformaldehyde, is added slowly with stirring to obtain a uniform dispersion, which is then heated up to 90° C. Next, a charge of 16.4 grams of melamine is dispersed in the reaction mixture, and then a charge of 44.4 grams of a mixture of o- and p-toluenesulfonamide is dispersed in the reaction mixture with heating up to about 100° C. until the melamine is completely dispersed in the reaction mixture. In this process ink resin preparation, the dye is added to the reaction mixture just after the paraformaldehyde has been dispersed therein, and in this case 11.3 grams of Brilliant Yellow 6G base is thoroughly dispersed in the reaction mixture just after the formaldehyde is dispersed therein and before the melamine is dispersed therein; and the resulting material is a yellow process ink product $X_1$.

A procedure is repeated that is the same as that described in the previous paragraph, except that the yellow dye used is Fluorol 7GA, and the result is a second yellow process ink product $X_2$.

A procedure is repeated that is the same as that described in the previous paragraph, except that the yellow dye used is Thioflavine T.N.C., and the result is a third yellow process ink product $X_3$.

A procedure is carried out that is identical to that of the previous paragraph, except that the dye used is Rhodamine 6 GDN, and the resulting material is a red process ink product $X_4$.

The procedure of the previous paragraph is carried out, except that the dye used is "Lithosol" Brilliant Blue E, and the resulting material is a blue process ink product $X_5$.

A procedure is carried out that is the same as that of the previous paragraph, except that the dye used is "Lithosol" Blue 6G, and the resulting material is a second blue process ink product $X_6$.

Vehicle $X_1$ is prepared by thoroughly mixing a charge of 73 grams of the previously described blend Y, and 16 grams of tung oil. Such vehicle X is approximately room temperature is added to the product X of each of the previous paragraphs of this Example, at about 95° C., and the mixture is then dispersed by agitation in the disperser, first at a temperature of about 95° C. and then with heating up to 140° C., at which temperature the reaction mixture is held with continued agitation until the condensation reaction appears to be complete and a small charge of Inkol-O is added to replace evaporated solvent and to obtain an approximately 90% solids process ink dispersion X, having a color depending upon the precisely selected color of the product X.

Vehicle $X_2$ may also be prepared by thoroughly mixing a charge of 73 grams of the previously described blend Y and 13 grams of tung oil.

Vehicle $X_3$ may also be prepared by thoroughly mixing a charge of 71.3 grams of the previously described blend Y and 18.7 grams of tung oil.

Also, the procedures for using vehicle X may be varied to control initial viscosity. For example, with vehicle $X_1$ only 5 grams of tung oil is added initially and 11 grams of tung oil are added after the dispersion is formed, and when the temperature of 140° C. is reached 4.8 grams of Acrawax C are added. Similarly, the tung oil addition for vehicle $X_3$ may be 5 grams initially, followed by 13.7 grams. As also indicated, comparable results are obtained if other waxes such as the polyethylene polymer are added instead of Acrawax in the manner just described.

Alternately, vehicle X is added (in the disperser) to product X and the resulting material is dispersed in the disperser at a temperature of 105 to 110° C., with agitation for 10 to 15 minutes, and the resulting material is then cooled to room temperature to obtain a resulting dispersion X. In such dispersion X, the pigment resin is probably in the thermosetting stage. Such dispersion X may be applied and heated either at the time of or after application and then cooled after the conversion of the pigment resin to the "thermoset" stage.

In this way the three primary color process dispersions X may be prepared in form for distribution to end users. It will be appreciated that the resulting ink formulations (as well as those made from the other examples herein) may have conventional ink additives added thereto, for example, on a three roll ink mill by the addition of approximately a total of 7% to 13% of conventional ink additives such as driers, varnish, stearates, waxes (e.g. Acrawax C, polyethylene polymers) etc., in order to obtain the desired viscosity and other properties for ink use.

EXAMPLE 52

In the preparation of the corresponding primary color process ink pigments believed to be made from thermoplastic resins, a charge of 35 grams of water, 1.5 grams borax (decahydrate) and 2 drops of 70% aqueous phosphorous acid is first warmed to 90° C., and a charge of 22.1 grams of 91% paraformaldehyde is then added slowly with stirring and heating up to about 90° C. in order to obtain a complete dispersion of the paraformaldehyde. Next, a charge of 11.25 grams of Brilliant Yellow 6G is added to the reaction mixture and thoroughly dispersed therein with stirring. Then, a charge of 12.6 grams of melamine is dispersed in the reaction mixture; and then a charge of 51.3 grams of mixture of o- and p-toluenesulfonamide is added thereto and dispersed with continued stirring and heating up to 100° C., to obtain a yellow product X, which is then cooled to 95° C.

A second process yellow product X is formed by carrying out the procedure of the previous paragraph using Fluorol 7GA as the dye.

A red process product X is prepared by carrying out the procedure of the previous paragraph using Rhodamine 6 GDN as the dye.

A blue process product X is prepared by carrying out the process of the previous paragraph using, as the dye, "Lithosol" Brilliant Blue E and/or "Lithosol" Blue 6G.

The dispersion is formed by adding 80 parts of the previously described vehicle blend Z to one of the products X just described, being maintained at about 100° C., and the resulting dispersion is agitated for 15 to 20 minutes with moderate heating at temperatures within the range of about 100° to 105° C., at which time the condensation reaction will have advanced. The makeup solvent charge then added is 13.5 grams of pale "H" linseed oil to obtain a dispersion X, having the color of the product X used in the preparation thereof.

Alternatively, the dispersion just described may be heated up to 145° C. (instead of the lower temperature of 105° C.) with violent agitation after addition of the linseed oil until the condensation reaction has apparently been completed, and then a makeup solvent in the form of Inkol-O is added to obtain a 90% solids dispersion X. Such dispersion X may also be used to provide the necessary color for process ink use.

The dispersion X of the previous paragraphs may be milled with conventional ink additives and applied as such in a printing process which involves a subsequent flash heating of the printed ink to convert the pigment therein from the thermosetting to the thermoset stage.

The theory of the amide-aldehyde (or amine-aldehyde) condensation reaction (and particularly the resin-forming reaction) is well known, involving the reaction of an aldehyde such as formaldehyde with a compound containing an $—NH_2$ group, for example, either attached to an S atom that is in turn attached to double bond O (as in toluenesulfonamide) or attached to a C atom that is in turn attached by a double bond to O, S or N. In general, the reaction is advanced as indicated in the following equations:

Initial methylol formation:

(1) 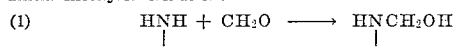

Advancement of condensation reaction to dimer:

(2) 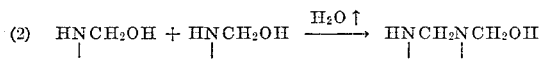

Advancement to trimer:

(3) 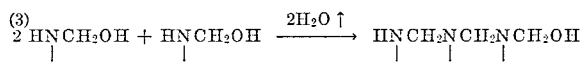

Advancement to polymer (generically):

(4) 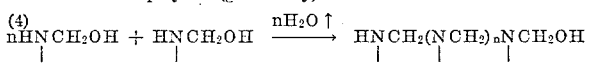

wherein $n$ is a small integer. Although some students of the reaction hold that the trimer of, for example, the toluenesulfonamide-formaldehyde reaction is already substantially dehydrated, being formed of three

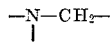

groups in a six-membered ring (without any methylol groups left), it is agreed among resin chemists that at least the initial phases of the condensation reaction involve the characteristic reaction of methylol amide (or amine) groups to combine separate molecules through a methylene linkage and to release water of condensation.

The overall "condensation reaction" sequence for amide-aldehydes involves the initial "addition" step (Equation 1) which may be designated as "methylol formation" (or "condensation-addition") as well as the subsequent steps wherein a volatile such as water is split off during the combination of molecules in what we here designate simply as "condensation reaction" (e.g. Equations 2, 3 and 4).

In the previous examples hereof, it is important to note that water is preferably present initially for such functional purposes as dispersing and/or retaining formaldehyde (which otherwise may tend to volatilize quite rapidly) and also assisting in dispersion of additional reactants, such as toluenesulfonamide, melamine, etc. It is believed that (at temperatures of approximately 100° C. preferably used) each of such additional reactants is initially dispersed into the heated reaction mass so as to appear to dissolve into the water present; but examination of the cooled reaction product X in each case reveals that such solidified, taffy-like and/or semi-solid gel-like reaction product is not a solution of reaction product in water, but instead a body of reaction product which may retain physically varying proportions of free water within the condensate macromolecular structure. In the preferred procedures, the earliest stage of co-condensation is preferred for product X (e.g. Example 1); but it is believed to be somewhat more accurate to define this as the "earliest substantially water insoluble stage."

In each of the foregoing (and subsequent) examples, the initial reaction product is an amide (or amine)-formaldehyde (sometimes referred to in the art as an "aminoplast") incompletely condensed reaction product. In other words, the initial reaction product X is prepared using such resin-forming reactants and/or under such time-temperature conditions that the bulk of "methylol formation" (Eq. 1) has been carried out and preferably at least to a nominal extent "condensation reaction" has been initiated (i.e. Eq. 2 et seq.), although such "condensation reaction" is understood to be far from substantial completion (i.e. to the "C-stage").

Ideally, such initial condensate of three or more reactants involves co-condensation of all of the reactants, e.g., formaldehyde, toluenesulfonamide and melamine of Example 1 to form the theoretical co-condensate "macromolecules." As a practical matter, however, such co-condensate macromolecules may predominate in the initial reaction mass to the extent that its physical properties of water insolubility, softening or liquefication temperatures, etc. appear to be those of the co-condensate macromolecules although at least some "homo-condensates," i.e. toluenesulfonamide-formaldehyde and/or melamine-formaldehyde may still be present, even though so entrapped or entangled in the co-condensate macromolecules that their presence is not readily discernible. If only two reactants, e.g. benzoguanamine and formaldehyde (Exs. 17, 20 and 21) are employed the so-called homo-condensation is theoretically and practically less complicated, but it will be understood that in such cases the product X is prepared by carrying the condensation reaction at least to the stage of obtaining water insolubility which is still a very early (A-) stage in the case of benzoguanamine but may be a more advanced stage in the case of other amide-aldehydes (possessing the requisite water insolubility).

There are certain practical and apparent differences among, for example, urea, melamine, benzoguanamine and toluene-sulfonamide even in the earliest stages of such formaldehyde condensation reaction sequence. Thus, toluenesulfonamide itself is substantially water insoluble (presumably because of the dominant hydrophobic aryl portion of its molecules) and so also are its formaldehyde condensation reaction products apparently even at the initial stages. Often toleuenesulfonamide and paraformaldehyde are melted together (to form what appears to be a homogeneous molten system) indicating formation of this initial condensate, which per se exhibits substantial water insolubility. Water may be present as an initial reactant dispersing agent, but if water is present, (e.g. Ex. 2) it apparently is inbibed into the initial condensate rather than dissolving the same. Additional heating of such initial condensate, e.g. at 100° C. or more, effects quite readily a substantial removal of such water from the reaction mass.

In contrast, urea per se possesses water-solubility and so do its formaldehyde condensation reaction products from the initial stages up to a rather advanced stage, i.e. (water insoluble), B-stage, prior to ultimate conversion to a infusible or thermoset C-stage (which exhibits a certain degree of water sensitivity); and urea may be simply stirred into aqueous formaldehyde whereupon an appearantly clear solution is obtained quite rapidly with formation of the A-stage initial condensate, presumably consisting of monomethylol and dimethylol-urea, plus some more advanced reaction products (Eq. 2 or 3).

On the other hand, the first evidence of any sort of reaction between melamine and formaldehyde, in an aqueous system, occurs when the melamine (which is not very water-soluble per se) appears to dissolve in the presence of the aqueous formaldehyde. As between these two materials, this then becomes the earliest or A-stage of the "melamine-formaldehyde resin-forming reaction condensation product." It is conceivable that at this early stage the formaldehyde functions to some extent at least as a solvent, but the practical effect (and as most authorities agree the actual effect) is that some initial combination of materials takes place, primarily along the lines of Equation 1 and only slightly Equation 2. The materials are uniformly distributed throughout the aqueous system, in what is generally recognized and sold commercially as relatively stable aqueous solutions of various concentrations of methylol-melamines and with nominal amounts of incompletely condensed "cacromolecules" generally comparable to commercially available ureau-formaldehyde commercial solutions. Melamine-formaldehyde condensates may be advanced in a relatively short period of time under relatively drastic condensation reaction conditions to a discernible B-stage (Ex. 454 which is substantially water insoluble but has not yet reached the final infusible state. It is generally accepted that completely condensed infusible melamine-formaldehyde resinous products (i.e. C-stage) exhibit substantially less water sensitivity than their urea-formaldehyde counterparts.

Although benzoguanamine is a member of the aminotriazine family, it possesses substantially less water-solubility than melamine and at a very early stage (i.e. A-stage) in its condenration with formaldehyde, the resultant homo-condensate (Exs. 17, 20 and 21) exhibits the substantialy water insolubility which is a characteristic property of each of the products X hereinbefore described.

In the forgoing examples, it will be noted that early stage (presumably A-stage) condensates are prepared by bringing together water, formaldehyde, melamine and toluenesulfonamide components (or their counterparts disclosed herein) in various sequences, and heating in order to obtain apparently uniform (homogeneous) liquids which may at first have the general appearance of aqueous solutions. Instead, however, examination of these condensates at room temperature reveals that they are actually substantially water insoluble gel-like materials which tend to attract and retain the water present as imbibed water. The phenomenon is known to take place in the case of certain other materials such as clays which tends to imbibe a limited but predetermined amount of so-called "non-solvent" plasticizer or "softener," but which materials separate out of such non-solvent plasticizer as a separate and distinct phase once they have imbibed their particular limit (or such predetermined amount) of such plasticizer. This seems to be characteristic of the instant incomplete condensates, which contain hydrophilic groups tending to attract or imbibe water in the limited quantities used herein; but which indicate very positively their substantial insolubility in water by separating out as a distinct phase, if one attempts to add quantities of additional water thereto, as if to form a dilute aqueous solution thereof.

In the case of truly soluble resin or condensate "macromolecules" it is known that solution in an appropriate liquid solvent therefor involves an initial solvent penetration of the entwined macromolecular system with usual swelling thereof but which is followed by breakdown thereof into substantially individual solvated macromolecules (and/or nominal aggregates thereof) which then become dispersed in such solvent to form a true solution or, if the macromolecules are unusually large, a colloidal dispersion, in either case having the fundamental characteristics of a solution including ability to undergo dilution by more solvent without phase changes, etc. In contrast, the incomplete condensates which are initially brought into contact with continuous phase in the practice of the instant invention have already been condensed to a substantially water insoluble state. Such condensates in this condition may be brought into contact with an excess of water and they may exhibit ability to imbibe a nominal additional amount of water with nominal swelling, but in such excess of water they retain their separate substantially water insoluble phase (Ex. 18). Additionally, prior to introduction of such condensates into the continuous vehicle, one may cool and grind and dry these incomplete condensates (Exs. 13, 18 and 19) and it is found that such dried material will imbibe, with nominal swelling and/or softening, a limited amount of water while still remaining as a separate substantially water insoluble phase in the presence of excess water. As demonstrated in Examples 13, 18 and 19 such dried and ground incomplete condensates can be readily dispersed in the organic continuous phase in accordance with the teachings of the invention, without the necessity of water being present in imbibed, retained or excess form. It appears, however, that retained or imbibed water in the incomplete condensate is functional at least to a limited extent as a non-solvent plasticizer which depresses the liquefection temperature thereof and thus facilitates improved formation of an initial as well as ultimate dispersed phase fine particle size. It is also possible that retained or imbibed water serves to impart more distinct immiscibility between the organic vehicle and the instant (substantially water insoluble) incomplete condensate starting material.

As previously indicated, the aforesaid described A-stage condensates of formaldehyde and aromatic sulfonamides with or without melamine and/or comparable resin-formers are all substantially water insoluble condensates. This is also true in the case of formaldehyde-benzoguanamine early stage (A- or B-stage type) condensates described hereinbefore (Exs. 15, 17, 19 and 20). Reference is thus made herein to the water insolubility in conjunction with the early stage or incompletely condensed reaction product X (rather than reference to the "classic" A- or B-stage alone) in order to identify product X more accurately as to its incomplete and/or early stage condensation so as to make it clear that it has not reached the ultimate C-stage or stage of substantial completion of condensation, but that it preferably has just barely been condensed enough for the particular condensate in question to have reached substantial water insolubility.

In general, the amide-aldehyde (incomplete) condensates used initially in the dispersed phase hereof preferably have low melting or softening temperatures, being in many cases liquids, soft pastes, solidified taffy-like and/or gel-like materials, etc. at room temperature; but in the practice of the invention condensation of the dispersed phase is preferably carried out in situ to raise the melting or softening temperatures (i.e. at least about 20° to 50° C.) at least sufficiently to evidence a significant advancement in condensation and to prevent the dispersed phase from coalescing in dispersion X under storage and use conditions.

Thus, the condensate having a first range of softening temperature (e.g. about 50° to 60° C. or less) is subjected to conditions advancing the condensation reaction to obtain a second range of significantly higher softening temperature (e.g. at least about 65°–70° C. with toluene-sulfonamide-formaldehyde resins but preferably at least about 100° C.). It will be appreciated that it is not absolutely necessary in the practice of the invention to carry the condensation reaction to substantial completion (i.e. C-stage) during the essential dispersion process, i.e. heat-agitation process involved in the formation of dispersion X from product X in vehicle X. One of the easiest and most effective ways of establishing that any advancement of the condensation reaction has been effected is through determination of an increase in softening temperature in the dispersed phase condensate, and the foregoing measurable softening temperature increases thus represent perhaps the practical minimum extent of such condensation advancement that should be involved in order to obtain benefits from the use of the method of the invention.

It is believed that the unique, generally spheroidally shaped, extremely minute dispersed particles in the resulting dispersion X of the invention are thus due to a most unusual combination of phenomena taking place for perhaps only an extremely short period of time in the environment of the agitation of the dispersion and/or emulsion. Included in these phenomena is liquefication by heat of the condensate to form a fluid material of low viscosity simultaneously with a maximum dispersion in the vehicle X.

Another factor would seem to include the use of relatively volatile plasticizers.

Such "plasticizers" may be in the form of the previously explained non-solvent plasticizer (e.g. water) or it may be in the form of a solvent plasticizer (e.g. dimethyl formamide, Ex. 53 infra). An excess of the former (i.e. water) may effect a phase separation whereas an excess of the latter (i.e. dimethyl formamide) may result in a solution of the initial substantial water insoluble condensate of product X.

As just indicated, if it is desired to depress the softening point of the initial, substantially water insoluble condensate of the invention that is employed in product X, such condensate may be employed in combination with at least about 5 to 10% of any truly solvent-plasticizer therefor, so long as such solvent-plasticizer is incompatible with vehicle X, in the sense that it does not render the material miscible with vehicle X. For example, a thermoplastic amide-aldehyde resin containing 10% of a volatile plasticizer therefor, such as dimethyl formamide, may be used as the product X in the practice of the instant invention to obtain superior results.

EXAMPLE 53

A resin is prepared in accordance with the procedure of Example 3 of Kazenas Patent No. 2,809,954 and product X is formed by thoroughly admixing therewith dimethyl formamide (in an amount equal to 10 weight percent of the resin). In such product X, the dimethyl formamide is a highly compatible solvent for the resin, which used in the small amount here specified also functions as a compatible plasticizer effectively reducing the softening point of the resin.

A charge of 55 grams of such product X and 35 grams of the aforesaid blend Y is thoroughly mixed and subjected to the high speed dispersion hereinbefore described, but such dispersion is carried out in a closed mixing vessel to avoid premature escape of the dimethyl formamide. Preferably, when a uniform dispersion is obtained at the temperature of 160–165° C., the vessel may be opened to permit the escape of the dimethyl formamide. Heat is removed and, while cooling to 140° C., a charge of 10 grams of boiled linseed oil is added with 10 grams of Inkol-O, and the resulting material is cooled to room temperature with continued agitation, to obtain spheroidal resin pigment particles of approximately one micron in size.

It will be appreciated that the foregoing product X was initially a C-stage resin and, thus, only the helpful effect of the softening point depressing solvent-plasticizer is apparent. If, instead of the foregoing product X, one uses a corresponding amount of the A- or B-stage product X of Examples 1 or 18 hereof (plus dimethyl formamide) in otherwise the same procedure as that described in the previous paragraph, the resultant dispersed phase is formed of discrete minute particles, significantly smaller in size than those described in the previous paragraph. This demonstrates the generally improved results obtained in the dispersed phase when some advancement of condensation reaction is carried out according to the invention. Such condensation advancement is favored by the dispersion temperatures of 160–165° C., even though the solvent itself may depress the softening temperature below 100° C.

It will be appreciated that in the foregoing procedure of Example 53, the plasticizer-solvent (dimethyl formamide) that is used is comparable in properties to dyes used with this type of resin, in that this plasticizer-solvent has a much greater affinity and/or solubility in the pigment resin than in any of the components of vehicle X. In this way this plasticizer-solvent will either tend to migrate toward the pigment resin or tend to be retained in the pigment resin during the dispersing procedure. Even if the plasticizer-solvent is a volatile material such as dimethyl formamide, while the agitation is carried out in the closed vessel and the dimethyl formamide is retained in the system, it will be found that this material has a greater affinity for, compatibility with and/or solubility in the pigment resin or condensate than in the vehicle X. In fact, the dimethyl formamide may be added to the vehicle X directly rather than to the product X and comparable results are obtained.

In addition, it will be appreciated that the substantially uniform dispersion of the plasticized resin particles of this example is obtained at about 100° C., which is below the softening point of this resin (without the dimethyl formamide). It will be found that a finer particle size of dispersion is obtained if the amount of dimethyl formamide employed in preparing the initial product X is 50 to 100% of the weight of the resin, so that a better dispersing effect from the solvent may be obtained.

It will be appreciated that the process of this invention may be carried out at a temperature below the softening point of the partially or substantially completely condensed resin (i.e., 115° C.) using an initial amount of various plasticizers sufficient to depress the resin softening point.

EXAMPLE 54

As previously indicated, it is preferred in the practice of the instant invention to employ the procedure described in detail in Example 1, involving a substantial advancement of the condensation reaction during the dispersion or agitation. The run of Example 1 is repeated using in place of the mixture of o- and p-toluenesulfonamide hereinbefore described, an equal molar proportion of commercially available p-toluenesulfonamide, and it is found that substantially the same results in dispersion X are obtained. Repeating the same procedure using alpha-toluenesulfonamide in place of the p-toluenesulfonamide, one also obtains substantially the same results.

It is found that similar results are also obtained carrying out the procedures of Example 1, using various other conventional or known vehicles as the vehicle X. For example, a first vehicle X formed by mixing a charge of commercially available 50% styrenated alkyl resin in an aromatic petroleum solvent with a K.B. value of 74.5, having approximately the viscosity of the vehicle X of Example 1, is used in the procedure of Example 1 to obtain comparable results. Likewise, similar results are obtained using a vehicle X having substantially the same viscosity, but formed of a commercially available styrenated long oil alkyl in approximately a 50% solids mineral spirits solution (the styrenated alkyd resin component being a semi-drying soya dehydrated castor oil alkyl modified with 40 weight percent of vinyl toluene, "Scopol 66NM"). Similar results are obtained using, as a vehicle X, a phthalic anhydride-dehydrated castor oil alkyd or a phthalic anhydride-linseed oil alkyd, in each case diluted in mineral spirits to obtain the viscosity desired. Still another vehicle X that is used is commercial "Scopol 55N/290" (a semi-drying dehydrated castor oil esterified with glycerol and copolymerized with 20% of vinyl toluene in a 60% solids solution in a 260–290° C. petroleum distillate).

Similar results are also obtained using the procedure of Example 1, but using in place of the melamine an equi-molar proportion of such other polyamino resin formers described herein as urea, thiourea, guanadine, guanazole, dicyandiamide, benzoguanamine, other amine-triazines, etc.

Similar results are also obtained by carrying out the procedures of Example 1 using other sulfonamides, which are (mono-nuclear) aromatic sulfonamides formed of a sulfonamido group attached to a benzene or benzyl group which may have one or two $C_1$–$C_4$ alkyl groups attached to the benzene nucleus. For example, similar results are obtained using o-toluenesulfonamide, sulfanilamide (whose exocyclic $NH_2$ is not without at least nominal functionality here), benzene sulfonamide, or p-ethyl benzene sulfonamide as the sulfonamide component (wherein the extra-cyclic substituents are primarily substantially inert functionally in the amine-aldehyde condensation reactions here involved).

The resulting dispersions X are diluted further and driers are added to produce printing inks in each case.

EXAMPLE 55

In the practice of the invention cyclic ureides such as dimethyl hydantoin and/or methylol compounds may be used, preferably as co-condensation reactants with benzenoid resin-formers such as aromatic sulfonamides and/or aromatic triazines (but also with simple triazines such as melamine). A typical example is as follows:

A charge of 10 grams of water and 13.2 grams of 91% paraformaldehyde is thoroughly mixed at about 80° C. Next, 12.8 grams of dimethyl hydantoin followed by 34.2 grams of a mixture of o- and p-toluenesulfonamide is added to the formaldehyde dispersion with stirring and heating up to about 100° C. until the ingredients are thoroughly dispersed therein to obtain product X.

The foregoing product is dispersed in vehicle X consisting of 50 grams of blend Y and 9 grams of boiled linseed oil in accordance with the procedures previously described (e.g. in Ex. 1) to obtain dispersion X having a very fine particle size.

EXAMPLE 56

Other embodiments of the cyclic ureide resin types are demonstrated as follows:

(56A) comparable results to those obtained in the previous example are obtained by using in that procedure a product X formed from 200 grams of water, 31 grams of 91% paraformaldehyde, 79 grams of monomethylol dimethyl hydantoin and 171 grams of paratoluenesulfonamide.

(56B) Comparable results are obtained by carrying out the procedure described in the previous paragraph, except that the ingredients used in the preparation of product X are 200 grams of water, 31.5 grams of 91% paraformaldehyde, 39.5 grams of monomethylol dimethyl hydantoin and 128.2 grams of paratoluenesulfonamide.

(56C) Comparable results are also obtained by using the procedure of the previous paragraph, wherein product X is formed by co-reacting in the manner just described 200 grams of water, 5 grams of borax decahydrate, 158 grams of monomethylol dimethyl hydantoin, 93.5 grams of benzoguanamine, 4.66 grams of Brilliant Yellow 6G, 0.56 gram of Rhodamine 6 GDN and 1.40 grams of Rhodamine B Extra.

(56D) Comparable results are also obtained using product X prepared by co-reacting 200 grams of water, 5 grams of borax decahydrate, 158.1 grams of monomethylol dimethyl hydantoin, 93.5 grams of benzoguanamide, and 4 grams of 91% paraformaldehyde. The dye added is a total charge of 2.3 grams of Brilliant Yellow 6G, 0.559 of Rhodamine 6 GDN and 1.398 grams of Rhodamine B Extra.

(56E) The procedure of the previous paragraph is repeated using, in the formation of product X, 200 grams of water, 5 grams of borax decahydrate, 22.6 grams of monomethylol dimethyl hydantoin, 4.6 grams of 91% paraformaldehyde, 122.1 grams of paratoluenesulfonamide, 31 grams of A-stage melamine-formaldehyde condensate, and 13.7 grams of 91% paraformaldehyde, in that order, with heating and stirring to disperse each of the ingredients before the next is added and obtaining a product X which is a uniform reaction mixture at about 100° C.

(56F) A charge of 200 grams of water and 31 grams of 91% paraformaldehyde is thoroughly mixed until the paraformaldehyde is dispersed therein, at about 80° C. Next, a charge of 53 grams of monomethylol dimethyl hydantoin and 114 grams of a mixture of o- and p-toluenesulfonamide is added to the aqueous formaldehyde with stirring and heating up to about 100° C. until the ingredients are thoroughly dispersed therein to obtain a product X, which is dispersed in the vehicle X according to Example 55, to obtain fine particle sizes.

The dyes employed in this procedure, or added in accordance with the procedure of Example 1, with a charge of 3.5 grams of Brilliant Yellow 6G being added to the instant substantially water insoluble product X and charges of 0.54 gram of Rhodamine 6 GDN and 1.05 gram of Rhodamine B Extra being added after the dispersion with vehicle X is formed and during agitation and heating.

In the practice of the instant invention, it is preferable in many instances to employ a co-condensed thermoplastic pigment resin, in the final dispersion X, formed of a sulfonamide-formaldehyde-polyamido resin-former type of condensation reaction. The preferred condensate is formed of $x$ mols of aromatic mono-sulfonamide component, $y$ mols of a poly-$NH_2$ type of polyamido resin-former component, and an amount of formaldehyde component preferably of at least about a total of $x$ or more. Still more formaldehyde up to a total of about $x$ plus $3y$ may be used in certain instances. Any excess of formaldehyde over and above that required for the reaction is ordinarily volatilized during the advancement of the condensation and does not result in any harmful effect upon the ultimately proudced resin.

In general, if the amount of the formaldehyde component is that just specified, a thermoplastic resin is produced using a ratio of $x:y$ of at least about 3:1. If the ratio of $x:y$ is less than about 3:1, the resulting resin is thermoplastic or thermoset depending upon conditions, including the total amount of the formaldehyde component used. If somewhat less formaldehyde component is used, it is still possible to obtain a thermoplastic resin in the practice of the instant invention.

Using dispersible thermosetting resins herein, one may find it advisable to exercise extreme care in the preparation of dispersion X so as to avoid conversion to the thermoset stage, and the dispersed resins may be easily convertible to the thermoset stage during a heat-set printing process or the like. It will be appreciated that the borax or comparable alkaline catalyst (e.g. ammonium hydroxide) which may be used during the condensation reaction has the effect of controlling the condensation reaction to the extent that the ultimate conversion to the desired condensed state is more within the control of the operator. Borax or an alkaline counterpart thereof is preferably used in reactions wherein the ratio of $x$ to $y$ is 3:1 or less.

Another feature of the instant invention which significantly affects the ultimate particle size of the dispersed pigment resin is the viscosity of the continuous phase or vehicle X and the manner in which it is affected by the temperature employed and/or the concentration of solid-film-forming or second resin therein. In the liquid vehicle X or continuous phase, a solid-film-forming or second resin is incorporated which imparts thereto a viscosity suitable for producing the desired shearing effect for fine particle production. A preferred composition suitable for use as a liquid vehicle for an ink may have a total solids content of approximately 50%, and this should be a free-flowing vehicle X. Actually, the total weight percent of film-forming solids may range from about 5% or 10% of high molecular weight material to as much as even 100% of a low molecular weight material in various ink vehicle compositions. In carrying out the agitation at an elevated temperature, however, a relatively high solids content or high molecular weight material in the vehicle X is preferred in order to impart the necessary viscosity to this phase. It will be appreciated that the total solids content of a final ink formulation, includes the solid dispersed pigment resin plus the solids dissolved in the continuous liquid vehicle phase. In the practice of the instant invention, during the agitation and condensation, wherein the weight ratio of dispersed phase to liquid vehicle X, as the continuous phase, may range from about 1:1 to about 2:1, and in such a "concentrate," the liquid vehicle X which contains dissolved solids preferably has a solids to liquid ratio of 2:3 to 3:2 overall, but ordinarily using proportionately greater vehicle solids ratios for proportionately greater ratios of product X to vehicle X (over the aforesaid range of 1:1 to 2:1). As indicated herein, the preferred amount of vehicle solids is that amount effective to function in the solid-film-forming capacity described which includes the ability to bind the pigment particles to the surface to which the instant dispersion is ultimately applied.

The dispersed pigment resin ultimately obtained in dispersion X is normally a solid thermosetting, thermoplastic, or thermoset resin. In color compositions, this dispersed phase is the dye carrying phase which is more receptive of and has a greater affinity or solubility for the dyes than the liquid continuous phase. This dispersed or discontinuous pigment resin is not compatible with the liquid continuous phase vehicle X under ordinary conditions of use and it may be opaque or transparent depending upon the coloring material used. In addition, the dispersed pigment is preferably polar but not ionic.

In contrast, the continuous liquid phase vehicle X is a vehicle or binder for the dispersed pigment resin, when ultimately used in a color composition such as a paint, ink, etc. When dyes are used, they preferably have a much greater affinity for the dispersed pigment resin than for vehicle X. The continuous liquid phase vehicle X is transparent, or at least sufficiently light transmitting to permit the color of the dispersed pigment resin to be observed. Also, the continuous liquid phase vehicle X is preferably substantially non-polar.

The continuous liquid phase vehicle X is a solid-film-forming material that acts as a binder for the dispersed phase incorporated therein; and preferably it is formed of a solid-film-forming resin combined with and/or dissolved in a suitable solvent. The liquid solvent can be a comparatively volatile material (such as pertoleum fractions, etc.), although it is preferably substantially less volatile than the volatile plasticizer which may be employed in product X, or the liquid vehicle X solvent may be a non-volatile material (such as drying oils, liquid polymers, etc.). The solid-film-forming components preferred for use in the liquid continuous phase vehicle X include such organic resins as the vinyl toluene copolymers, oil-modified alkyd resins, isophthalic long oil-modified alkyd resins, cyclized rubber, and the like, all of which resins are preferably not highly thermo-reactive under the conditions of the instant method, or at least are not as sensitive to the heat ordinarily employed during the agitation at moderate or at elevated temperatures employed in the practice of the invention, so as to react, thermoset, cure or otherwise interfere with carrying out the agitation step. These solid-film-forming resins, however, are capable of carrying out their essential function by air drying, curing, or otherwise hardening in the ultimately used paint or ink composition.

The term "selective light absorbing agent" as employed herein and in the claims is to be understood to mean materials which absorb electromagnetic radiation (both visible and invisible) such as for example ultraviolet absorbers, infrared absorbers, opacifiers, reflecting agents, powdered metals, pigments, dyestuffs and other coloring agents (which would involve absorption of radiation in the range of about 3000 to about 10,000 A.).

The term "coloring agent" as employed herein and in the claims is to be understood to mean materials such as, for example, pigments and dyestuffs (with or without associated reflecting and opacifying agents) which impart color or hue to the dispersed phase. The term "fluorescent agent" is to be understood to mean materials which impart to the dispersed phase the property of emitting visible light under fluorescigenous energy. The term "daylight fluorescence" is to be understood to mean materials which impart to the dispersed phase the property of exhibiting color due to the phenomenon of selective reflection and absorption as well as fluorescence in response to visible light (i.e. natural sunlight or artificial polychromatic light generally referred to as "white" light), which would be dissipated as heat by subtractive colors.

Although certain circumstances may dictate a preference for adding the vehicle X to the product X, or vice versa, in effecting the instant dispersion, in the practice of the invention the ultimate dispersion is a product-in-vehicle dispersion and the best results now appear to be obtained by the addition of the vehicle X to the product X, when the vehicle X is at approximately room temperature whereas the product X is heated to a slightly elevated temperature up to about 90–95° C., at which temperature one can ordinarily obtain maximum mobility (and/or preparation for liquefaction) in the product X, while at the same time effectively substantially stabilize product X for at least reasonable periods before dispersion since conspicuous acceleration of the condensation does not seem to occur until the temperature is raised at or above 100° C. in the bulk condition and/or in the dispersed phase of product X in vehicle X.

As previously indicated, water initially used in forming product X assists in the dispersion of the reacting ingredients. The water retained in the molten or syrup-like reaction mass appears to facilitate dispersion and quite probably does under the preferred reaction conditions of the invention. Only a relatively superficial visual evaluation of this apparently transitory function in the molten reaction mass is possible, however, as a practical matter; but the substantially water insolubility actually obtained in the formed (although incomplete) condensate of product X under ambient conditions can and has been established. The water function in the formed product X is therefore, believed to essentially be that of a softening temperature depressing non-solvent plasticizer (often referred to as a "softener"), which is readily distinguishable from truly solvent or primary plasticizer function (e.g. dimethyl formamide) which latter material, although too volatile to be classified as permanent plasticizer, does function to depress the product X softening temperature and which could, if used in sufficient excess presumably dissolve product X. It must be appreciated that both solvent and non-solvent plasticizers referred to herein are preferably essentially fugitive under the dispersion conditions. In fact, it will be noted that the vehicle X is preferably added to the syrup-like product X (at 90–95° C.) with only brief agitation to effect formation of a generally uniform emulsion (by the test hereinbefore described) and substantially immediately after initial dispersion or emulsion formation the dispersion is heated to substantially above 100° C., preferably substantially 125° C. or more, so as to effect a reaction scene or environment wherein the fugitive character of such diluents is clearly manifested and condensation reaction (Eq. 2 through 4) is greatly favored. These conditions tend to drive free fugitive plasticizer (i.e. water, dimethyl formamide, etc.) out of the dispersed reaction system as volatiles and also tend to accelerate condensation-dehydration. The dispersed phase pH may be used to control (to the extent required) such accelerated condensation reaction, but it is an essentially significant feature of the invention that the best ultimate results are obtained in the dispersed reaction system if substantially all reaction conditions (and, particularly the elevated temperature) favor predominantly the accelerated condensation reaction, and fugitive plasticizer removal from the reaction scene.

Although the minimum amount of plasticizer in or combined with product X of the invention has certain critical aspects, the maximum amount in most cases is a matter of choice, although the practical limit involved is that of avoiding such an excess of fugitive plasticizer that production is delayed by removal of such plasticizer during the agitation with heat. In general, the ratio of fugitive diluent (combined or free) in product X to the ultimate solids resin yield may be as high as 3:1 or 4:1, depending upon the relative ease (dimethyl formamide) or difficulty (water) of removal, and ratios above 10:1 are not considered practical in most instances. Usually, the ratio involved is less than 1:1 so that a "syrup" (particularly in the case of aqueous syrups) is obtained which is very readily handled and is dispersed with ease. The aqueous "syrup" is so designated because it is generally understood to contain a significant amount of water (for plasticizer softening point depression) and it has free-flowing syrup-like liquid properties at the time of its initial contact with the vehicle (at which time such syrup product X is preferably at an elevated temperature, i.e. 90–95° C., approaching but not quite at or above 100° C. so as to arrest or delay premature condensation reaction prior to dispersion). This syrup, as indicated previously, preferably has a pH of about 9.5 as a result of an alkaline buffer such as borax for better control of the condensation reaction. The formation of the uniform emulsion itself may take place at a temperature in the range of 70° C. to 100° C., and ordinarily in the practice of the invention this is the case; and the resulting dispersion so obtained can be used in its present form (or diluted with solvents for vehicle X) in certain paint uses, so long as the plasticizer in product X is relatively volatile, e.g. as volatile as water. The plasticizer is, as herein shown, preferably driven off during the formation of the dispersion X by heating, at least above the plasticizer boiling point and for best results to temperatures within the range of about 125° C. (which is a practical minimum for acceleration of combined rapid plasticizer removal and condensation) to about 185° C. (which is a practical maximum for operation of this type of reaction).

In this respect, it should be appreciated that the volatility of the plasticizer must be taken into consideration. Such relatively volatile solvent-plasticizers as dimethyl formamide may be volatilized and substantially removed (except for traces) from the system with comparative ease, by first carrying out the desired formation of the uniform dispersion in a closed container, but at a temperature at which the dimethyl formamide would tend to volatilize, and then releasing the dimethyl formamide rapidly. Water, having a very substantial heat of vaporization, does require a definite time period at a temperature above 100° C. in order to effect substantial removal thereof, and this is so even though the condensation reaction is greatly accelerated. The nominal amount of time involved in bringing into initial contact product X and vehicle X and obtaining the initial emulsion at substantially 100° C. (sometimes slightly lower) thus involves only nominal, if any discernible, condensation reaction; but immediately thereafter the substantial heat input to the system, drives the temperature substantially above 100° C., preferably to substantially 125° C. and more, and achieves greatly accelerated condensation reaction and water removal as herein described.

EXAMPLE 58

A charge of 25 grams of water, 1.0 gram of borax (decahydrate) and 2 drops of 70% phosphorous acid are thoroughly admixed with stirring at 90° C. A charge of 21.4 grams of 91% (active) paraformaldehyde is then thoroughly dispersed in the reaction mixture, and this is followed by a charge of 1.5 grams Brilliant Yellow 6G base and 0.75 gram of Rhodamine B Extra. Then is added a charge of 14.2 grams of melamine with continued stirring; followed by 55.5 grams of meta-benzenedisulfonamide and 19.3 grams of a mixture of o- and p-toluenesulfonamide and stirring and heating to 100° C. is continued until a uniform dispersion is obtained in the resulting product X.

Vehicle X is prepared by thoroughly admixing 52 grams of the vehicle blend of essentially 60% solids in the form of a 45% vinyl toluene alkyd copolymer resin and 40% Inkol-O and 15 grams of a blend prepared by admixing 12 grams of pale "H" linseed oil, 6 grams of tung oil and 8 grams of technical grade zinc stearate (the blend is melted together at 200° C., air cooled and milled on a three roll ink mill until the stearate is dispersed).

Vehicle X at room temperature is added to product X at about 95° C. with high speed stirring in the disperser until the mixture is dispersed; and then with continued heating up to 150° C. to obtain the resulting dispersion X having the properties of the invention hereinbefore described. The dispersed resin herein is thermoset.

EXAMPLE 59

A charge of 35 grams of water, 1.5 grams borax (decahydrate) and 2 drops 70% phosphorous acid are thoroughly admixed at 90° C. With continued stirring there is then added successively 22.1 grams 91% (active) paraformaldehyde, 3.38 grams Brilliant Yellow 6G base, 0.38 Rhodamine B Extra, 12.6 grams melamine and 51.3 grams of a mixture of o- and p-toluenesulmonamide. The mixture is heated with stirring to 100° C. to obtain product X as a uniform dispersion.

To product X at 100° C. is added 60.3 grams of Trianol 3 (reportedly an iso-phthalic long oil alkyd, 100% solids, #3 viscosity) with high speed agitation in the disperser and the resulting mixture is dispersed at about 95° C. Agitation and heating are continued to 125° C. at which point a charge of 4.1 grams of Rhodamine dye paste Y is added and the resulting dispersion is heated with stirring to 145° C. at which time 15 grams of Magie Oil 590 is added with stirring and then cooled to obtain dispersion X of the invention.

EXAMPLE 60

A charge of 35 grams of water, 1.5 grams borax (decahydrate) and 2 drops 70% phosphorous acid are thoroughly admixed at 90° C. and there is then added successively, with stirring, 22.1 grams 91% (active) paraformaldehyde, 7.5 grams Titanox AWD, 51.3 grams of a mixed o- and p-toluenesulfonamide, 12.6 grams melamine and 0.38 gram diethyl amino methyl coumarin until the mixture forms a uniform dispersion at about 100° C.

A charge of 80 grams of vehicle blend Z is added to the above described product X with high speed stirring in the disperser at 95° C. until the uniform dispersion passes the smear test. The dispersion is then heated with stirring and heating to 105° C. at which time there is added 13.5 grams of pale "H" linseed oil and at 130° C. there is added 5 grams of polyethylene polymer (AC–6). Agitation and heat are continued to 145° C. when additional Inkol–O is added to replace the solvent loss and the material cooled to obtain the desired dispersion X, to which driers and solvents are added to form a printing ink.

In the manufacture of printing ink, it will be appreciated that conventional dryers, flow control agents, solvents, etc. are added to produce the finished ink from dispersion X. As pointed out in the example the dyes are preferably added to product X, however, if instead of adding the dyes during the preparation of product X, these dyes are added to the vehicle X and/or resultant dispersion X, it is found that the dyes migrate to the resin particles in the dispersed phase, which absorb or otherwise retain the dyes so as to form colored pigments, having the particle size properties hereinbefore described. This procedure has the advantage that the end user of a pigmented composition (such as the instant ink composition) may purchase the dispersion X with the pigment resin in uncolored form from a supplier and then effect the coloring thereof with the desired dye or dye combination. The pigment resin in the dispersed phase is capable of retaining the dye in concentrations effective for daylight fluorescence and is further capable of selectively absorbing the dye from the continuous phase, so that the resulting ink composition holds substantially all of the dye within the dispersed pigment particles.

Instead of dyes, it is possible to use in the present invention coloring agents and/or inorganic pigments of extremely fine particle sizes, e.g. Titanox AWD (Ex. 60) or alternatively Cadmium Selenid Medium Red Pigment No. 1422 (Harshaw Chemical Co.), incorporated into product X. It will be appreciated that the final particle size in such example is dependent upon the particle size of the pigment used to color the resin. The final particle cannot be smaller than the colored pigment particle. Accordingly, it is necessary to use coloring pigments with a very fine particle to obtain uniform fine particle size in the concentrate and in the finished ink.

In the practice of the instant invention, the temperature employed during agitation of the dispersion is a significant factor in controlling the average particle size ultimately obtained. The meltable incomplete condensate materials (with and without plasticizers) used herein as product X do not ordinarily have a sharp melting point and the fluidity of such resins in the liquefied or molten state is increased as the temperature thereof is increased particularly in the initial stages of dispersion X. In the practice of the invention it is ordinarily preferable to employ a heat input to reach maximum temperature during the vigorous agitation in the range of approximately 50° to 100° C. above the softening point of initial product X. In the practice of the instant invention, the mode, speed, intensity and duration of the agitation during the dispersing step are further factors in controlling the average particle size ultimately obtained. Still another important factor is the vehicle viscosity (and resultant shearing effect) under the agitation conditions employed. Generally speaking, longer and more vigorous agitation leads to smaller particle size. On the other hand, perhaps one of the most significant factors herein is the combination of the heat input rate (and resultant high temperature already mentioned) with the actual condition of the incompletely condensed amide-aldehyde product X at substantially the time of bringing it into initial contact with vehicle X and dispersing the same therein.

Product X hereof is preferably a generally homogeneous (one-phase) reaction mass as described, not containing substantially more water than it can tolerate (or imbibe); but water in moderate amounts within the product X when initially contacted with and dispersed in vehicle X has been found to be extremely useful as a product X plasticizer.

The compositions of the invention appear to have many of the essential properties of colloids. The dispersed particle size range from about one micron to about 100 A. (angstroms) is a characteristic of the preferred compositions, and the best compositions have dispersed particles with sizes of about the wavelength of visible light and less (e.g. about 6000–7000 A. ranging perhaps down to approximately 100 A.). These preferred particle sizes are obtained when condensation of the dispersed phase resin particles is advanced in situ in the vehicle.

EXAMPLE 61

A charge of 20 grams of water, 1 drop of 70.1% aqueous phosphorous acid, 0.3 gram of potassium tetraborate, 20 grams of 91% (active) paraformaldehyde, 18.5 grams of acetylene diurea, 6.5 grams of melamine, 44 grams of a mixture of o- and p-toluenesulfonamide, and 1.72 grams of Brilliant Yellow 6G base is stirred, while heat is added continuously until a temperature of 100° C. is reached, to obtain a generally homogeneous reaction mixture to form product X.

To the heated (i.e., 95–100° C.) product X is added a charge consisting of 85 grams of vehicle X [formed of a blend of 187 grams of a 42.8% solids of styrenated copolymer resin (resin component of Cycopol 341-17) in Magie Oil 535 and 80 grams of vehicle resin S], 0.67 gram of Rhodamine B Extra and 4.5 grams of Rhodamine dye paste Y, at room temperature, with stirring and continued heating to effect a uniform dispersion at about 95° C. (in about 2–3 minutes). The dispersion is then subjected to additional stirring and heat input over a period of about 15 to 20 minutes, until a temperature of 140° C. is attained, and then a charge of 3 grams of polyethylene polymer (AC-6) and 5 grams of pale "H" linseed oil is added with continued stirring and heating until a temperature of 150° C. is reached and held briefly until escape of volatiles from the dispersion appears to have substantially discontinued. The dispersion is then allowed to cool to room temperature. It is found that the minute discrete solidified dispersed phase particles in the dispersion thus obtained haved exceptional light stability and other superior optical characteristics.

EXAMPLE 62

A charge of 50 grams of water, 2 drops of 70% aqueous phosphorous acid, 2.16 grams of potassium tetraborate, 76 grams of paraformaldehyde, in flake (95% active) form, 50.4 grams of melamine and 136.8 grams of a mixture of o- and p-toluenesulfonamide is heated to 100° C. and mixed thoroughly to uniformly disperse the ingredients, and to this dispersion is added 2.16 grams of Rhodamine B Extra with continued stirring and the reaction mass are heated to 103° C. to form an early stage condensate. The heating is then discontinued and the resultant condensate is allowed to cool to room temperature, at which such condensate hardens sufficiently to be ground to obtain a pulversized product X.

(62A) Then 60 grams of vehicle X of Example 61 is heated to 140° C., with constant stirring. To the heated vehicle a 50 gram pulverized portion of the above product X is added, with continued stirring and an accompanying temperature drop to 105° C. over a period of a few minutes, during which a uniform dispersion is formed. The stirring and heating is continued for about 10–15 minutes more, until a temperature of 120° C. is reached. The resulting dispersed phase pigment resin is then extracted from the vehicle X and found to have a softening point of substantially 147° C.

(62B) Another 60 gram portion of the aforesaid vehicle X is heated to 140° C. and again a 50 gram portion of the aforesaid pulverized product X is added to such vehicle X with high speed stirring, again with a brief accompanying temperature drop to 105° C. during dispersion formation. The stirring and heating are continued for about 15–20 minutes until a temperature of 140° C. is reached and then the mixture is allowed to cool to room temperature. Upon extraction of this resultant dispersed phase pigment resin, it was found to have a softening point of substantially 170° C.

(62C) A still further 60 gram portion of the vehicle X is heated to 140° C. and another 50 gram portion of the aforesaid pulverized product X is added to the instant heated vehicle X with high speed stirring, again accompanied by a brief temperature drop to 105° C., to obtain a generally uniform dispersion of the liquefied dispersed phase in the vehicle. The stirring and heating are continued this time until a temperature of 160° C. is reached (over about 20–25 minutes) and the dispersion is then allowed to cool to room temperature. The softening point of the extracted dispersed phase pigment resin in this instance was found to be substantially 205° C.

The above procedures indicate that continued condensation (as measured by incremental increases in softening temperature) of such dispersed phase resin takes place by continued heating and agitation at substantially above 100° C., and that the continued condensation does not adversely affect the formation and retention of the generally fine discrete particles as the formation of the fine particles generally takes place when the pigment resin is in the liquefied or molten state; but merely increases the softening point by promoting further condensation.

EXAMPLE 63

A charge of 342 grams of o- and p-toluenesulfonamide, 126 grams of melamine and 95 grams of paraformaldehyde (95% active) was heated with stirring to a temperature of about 102° C. and then a 2.16 gram charge of Rhodamine B Extra was added with continued stirring and heating to uniformly disperse the dye in the resin. The heating was discontinued when a temperature of 103° C. was attained, and the comparatively water-free resin is allowed to cool to room temperature at which it is ground to obtain pulverized product X.

Then 60 grams of vehicle X of Example 61 is heated, with constant stirring, to 130° C. To the heated vehicle X a 50 gram pulverized portion of the aforementioned product X is added with continuous stirring and an accompanying temperature drop to 100° C. (over a brief period sufficient to obtain a uniform dispersion). The heating and stirring is continued (for about 10–15 minutes) until a temperature of 130° C. is attained, at which point 8.6 grams of paraformaldehyde (95% active) is slowly added. The dispersion is then heated, with continued stirring (over an additional 10–15 minutes) to a temperature of 150° C. The heating and stirring are then discontinued and the dispersion is allowed to cool to room temperature. It is believed that the fine discrete dispersed phase pigment resin particles thus prepared is thermoset, thereby affording certain distinct advantages of the invention via comparative nominal (and belated) advancement of the condensation reaction.

As the reaction between the additional formaldehyde and the pigment resin does not take place to any appreciable extent until the pigment resin has been converted to molten state (which does involve definite particle size reduction via some condensation advancement here) and dispersed as generally fine discrete spheroidal particles in the process, the ultimate fine spheroidal particle size of the pigment resin in the final product probably is not as fine as can be obtained using the procedure of Ex. 1. Apparently they are not appreciably altered by the belated advancement of the condensation reaction here involved and the reaction does not result in agglomeration or other undesirable side effects, but rather a substantial increase in the softening point of the pigment resin is achieved. In fact, such softening point increase may be sufficient to render the resin thermoset.

The dispersed particle size is not necessarily limited to a maximum of one micron. Some types of excellent printing ink compositions of the invention can be obtained with dispersed particle sizes up to 5 or 6 microns. (Those of about 1 micron or less than about 0.7 micron are superior, however, in most types of printing inks.) An additional characteristic present is the relative uniformity of readily measurable dispersed particle sizes resulting in a composition made in the practice of the invention. Thus, with the larger (and more readily measured) particle sizes, it will be noted that it is possible to obtain an average size of 2–5 microns, for example, in a range limited substantially to about 1½–6 microns, which means that the particles are substantially all within about ⅓ to 3 times the average particle size. This is an extremely fine cut (a generally symmetrical particle distribution) that could not possibly be obtained economically by grinding or other types of particle fracture, separately or in the presence of the vehicle. On the other hand, in the case of such extremely fine particle sizes as are obtained in Ex. 1, these sizes are so minute for the present-day usage and measuring techniques that they do, in fact, behave as substantially uniformly sized particles.

The compositions of the invention further distinguish from a system of particles ground in or precipitated chemically from a solution in a given vehicle (even if such particles are very fine). This may well be a result of surface activity, surface tension, interfacial forces, etc. created in the orientation of the original emulsion, and carried over during the solidification of the particles in situ.

Ground particles or those formed by chemical precipitation of materials from a solution in the vehicle have a characteristic rough surface; whereas the particles of the invention are found to be rounded or spheroidal in shape. The optical properties obtained in the invention demonstrate dramatically this physical property.

The process envisions shearing of "single phase" molten viscous dispersed globules in situ by agitation of a continuous phase wherein at least preferably about 40% to 50% solids impart functional viscosity thereto. The term in situ, with reference to fine particle formation in the continuous phase, does not preclude certain alteration, dilution, concentration, etc. of the continuous phase subsequent to such formation in situ. Such shearing effect is hardly conceivable in, e.g., water and such would ordinarily not be typical of the instant concept. The in situ particle formation of course does not preclude subsequent addition of ink or paint diluents or thickeners, driers, modifiers, etc. Such modifications of the continuous phase or vehicle, of course, do not contemplate significant particle flocculation or other phenomena inconsistent with the contemplated uses, e.g., as printing inks, etc. It is significant to note that at least certain of the more important characteristics of the continuous phase present during such in situ particle formation are retained, and this is because it is believed that a certain particle orientation vis-a-vis the continuous or vehicle phase is developed in the invention at an early stage, e.g., when the dispersed (liquid) phase of the emulsion is initially formed, and this is retained during the subsequent chemical and/or physical changes of the dispersed phase in situ in the vehicle (e.g. from substantially water insoluble condensate, through the phase change from liquid to solid, or in the case of some partially pre-condensed resins, through the solid-liquid-solid phase change sequence). This leads, it is believed, to the creation of unique stabilizing forces or phenomena in the dispersion system.

The stability of the instant compositions is an important characteristic. An important factor of this stability is an apparent wetting of the dispersed particles by an absorbed layer or layers of vehicle on the particles preventing them from touching each other (and flocculating). The phenomena involved in such stabilization are believed to occur at least in part, if not substantially at the time the instant particles go through solidification from a liquefied state in situ.

One essential, common characteristic of the instant compositions is that the dispersed phase solid particles are formed in situ in the continuous phase or vehicle, such in situ formation in every case being involved with a distinct energy change, usually a heat energy change concurrent with in situ particle formation. It will be appreciated that a distinct energy change could involve the release of the energy of a catalyst for effecting advancement of the condensation in situ.

In general, the energy change in the dispersion should be at least equivalent to (and/or manifested by) a temperature change of 10° to 20° C.; and usually a much more substantial temperature change is employed. In certain examples hereof, addition of vehicle X at room temperature to the product X at about 95°–100° C. drops the mixture temperature to at least about 80° C. The initial emulsion forms quickly and is then heated probably about 50° C., with continued agitation, and with the dispersed phase in existence, from perhaps 85°–90° up to 140° C., whereat heat input is continued to maintain the temperature of 135–140° C. during volatilization of the water. Then there is a further energy change in the system (over more than 100° C. temperature change) with cooling to room temperature. The production of the final composition thus necessarily involves chemical formation of the particles in situ, liquefied (condensed resin) particles in situ, solidification of the particles by cooling in situ, and physical formation of the particles in situ.

The preferred process concepts resulting in preferred compositions afford unique optical and stable colloid characteristics, and selectively such fine size cuts as the 0.01 to 0.02 micron range (Ex. 1), 0.2 to 0.6 micron range (incident light wavelengths), or the ranges 0.2 to 0.4 micron and 0.4 to 0.6 micron (respectively, below and at dominant wavelengths for daylight fluorescence), such particle sizes being generally of not more than the longer wavelengths of visible light (i.e. which cannot be resolved in an optical microscope and are thus less than about 0.6 micron or 6000 A.). The preferred particles are thus condensed in situ. Expressed otherwise, condensation is advanced within the particles in situ. Thermoplastic particules thus condensed in situ solidify in situ by cooling (subsequently).

In Example 58, conversion to the thermoset resin particles in situ (i.e. solidification in situ without cooling) takes place, but otherwise all of the previously mentioned phenomena involve the particles in situ (i.e. condensation, liquefication, solidification, etc., all with energy or temperature change). There is undoubtedly an instant when each dispersed particulate component passes from liquid to solid phase, in the thermosetting process, in situ in the vehicle or continuous phase (i.e. it is solidified in situ).

The temperature change in the dispersion and, therefore, in each dispersed particle in situ occurs thus concurrently with at least a momentary liqiud state as well as a solid state formation of the particle in situ—by cooling with a thermoplastic resin and by continued heating when a thermoset resin is formed. Even if care is taken to produce a solid dispersed resin particle in situ that is heat-sensitive and readily converted to the thermoset stage (subsequently), this resin will have gone through heating (to liquefy) followed by cooling to solidify that is a characteristic of thermoplastic dispersed resin formation of the invention (however, transitory the liquefication of the resin per se may have been); moreover, this resin will be thermoplastic or thermo-fusible for at least one more sequence, in situ, when and if it is ultimately converted to the thermoset stage.

The dispersed phase particles must be solidified in situ. They must be heated and solidified in situ in case of thermoset resins, and solidified by cooling in situ in the case of most thermoplastic resins. In either case they have passed from a liquid to a solid state in situ, whether the liquid state is produced by heating the pre-formed resin per se or in a plasticized form, or by condensation. In every case the liquid-to-solid state transition in situ involves a significant (heat) energy change, e.g. cooling, heating and cooling, heating to fuse the resin and evaporate the plasticizer to raise the resin fusion temperature and/or then cooling, heating to condense and then cooling, and heating to condense and thermoset.

EXAMPLE 64

A charge consisting of 25 grams of water, 1 gram of borax (decahydrate), 2 drops of 70% aqueous phosphorous acid, 1.5 grams of Brilliant Yellow 6G base, 0.5 gram of Rhodamine GSW, 0.75 gram of Rhodamine B Extra, 24.7 grams of 91% paraformaldehyde, 16.4 grams of melamine, and 44.4 grams of a mixture of o- and p-toluenesulfonamide was heated together at 100° C. for 5 minutes in accordance with the previous procedures, to obtain product X.

Vehicle X is prepared by blending 60 parts of cotton seed oil and 40 parts of the resin of Cycopol 341–17. 80 grams of such vehicle X is then added to product X of the previous paragraph, and the mixture is emulsified in a high speed disperser and heated to 145° C. to complete the product X condensation. Since the continuous phase of such dispersion X contains a non-drying oil that retains the solid-film-forming resin, it will be appreciated that the solid-film-formation of the dispersion X will be very slow in this condition. The in situ condensation and solidification of the dispersed phase particles in the relatively viscous continuous phase achieves the desired results of the invention hereinbefore described, however, and the mere fact that it may be desirable to add to this dispersion X perhaps an equal volume of blend Y to obtain a rapidly drying or curing dispersion does not subtract from the fact of in situ dispersed particle formation in a solid-film-forming continuous phase (as the term is used herein).

The preferred products X hereof are aromatic-aminoplast condensates, which have typical aminoplast structures containing the aromatic groups, i.e., formed of benzoguanamine of the (aromatic) polyaminotriazine group of resin-formers or the aromatic (also mononuclear aromatic) sulfonamides. It has been found that the early stage aromatic aminoplast condensates hereof are substantially water insoluble as initially formed and here used as product X. This general characteristic of such aromatic-aminoplast early or A-stage condensates apparently is typical of the simplest formaldehyde homo-condensates of toluenesulfonamide, benzoguanamine, etc. as well as the various co-condensates thereof which includes typical ureas and polyaminotriazines (non-aromatic guanamines and melamine), etc., which are resin-formers characteristically containing a plurality of —$NH_2$ groups each attached to a C atom which is, in turn, attached by a double bond to =O, =N— or =S (often referred to as thermosetting resin-formers when used in formaldehyde homo-condensates). Such aromatic-aminoplasts used herein are condensates wherein the aromatic resin forming component imparts substantial water insolubility to the early or A-stage condensates. This is true of the various aromatic-aminoplast early or A-stage co-condensates of formaldehyde, aromatic amides or polyamino resin-formers, and characteristics cyclic ureide resin-formers, e.g. acetylene diurea, ethylene urea and hydantoins, which materials contain a plurality of —NH— groups each attached to a C atom which is, in turn, attached by a double bond to =O, =N— or =S, typically the poly —NH— groups and each such C-atom are heterocyclic rings, i.e. the ureido-ring. Such aromatic-aminoplast co-condensates, which include the foregoing (poly-NH—) cyclic unreide-aromatic-aminoplasts, effect substantial water insolubility beginning at the early or A-stage (of initial homogeneity) and they also possess at all condensate stages (A, B and C) substantial immiscibility or insolubility (plus excellent dispersibility) in the preferred solid-film-forming liquid phase hereof which is an aromatic-resinous vehicle (i.e. a benzeoid vehicle containing phthalic alkyds and/or alkyds modified with styrene and/or vinyl toluene).

As already shown in detail, an advantage particularly unique in the just mentioned preferred dispersion systems of the invention resides in the dispersed extremely fine particle sizes which are obtained. This criterion is on the basis of substantial inability to resolve the same in an optical microscope; although more sophisticated measuring techniques now reveal that the bulk or substantial measuring techniques now reveal that the bulk or substantial majority of the particle sizes are distinctly submicron, and in one aspect of the invention are in the hundredths of a micron size. These are obtained in thermoset, thermosetting or thermoplastic dispersed phase condition via the substantial advancement of condensation in situ in the vehicle.

Although it is not desired to limit the invention to any particular theory, it will be recognized that preparation of a substantially water insoluble initial incompletely reacted aminoplast condensate, as described herein, often involves the use of some water which tends to be retained in such aminoplast condensate, presumably as a non-solvent plasticizer. The aminoplast condensate per se (prior to addition to the vehicle X) thus apparently forms an external or continuous phase giving the appearance of homogeneity even with some retained water (as the plasticizer).

In such condition the generally homogeneous water-plasticized aminoplast phase possesses a viscosity generally responsive to temperature changes and various other properties which distinguish it from a water solution of a condensate (wherein the water is the external phase). Instead, it appears that the relatively controllable properties of viscosity, etc. afforded by water insoluble systems wherein the condensate forms the external (i.e., single) phase make possible a much better overall control of dispersion of globules thereof in the vehicle X under the present conditions to obtain such advantages as limited globule size ranges, sufficiently fine desired globule sizes, etc. This may well be afforded by the fact that substantially the entire periphery of such dispersed globules of external phase aminoplast condensates afford some unique compatibility with the continuous vehicle X in contact therewith, or some unique ability to be "wetted" by the vehicle X for better mutual repellance and/or the more readily controlled viscosity of such globules of external phase aminoplast condensates afford some sort of synergism in the matching of the relative viscosities between dispersed phase and vehicle X and/or in merely the relatively less mobility and/or agglomerating tendencies of such dispersed condensates (as compared to aqueous solutions of condensates). The precise phenomena cannot be fully understood, but there are recognizable and distinct advantages herein achieved by initially contacting and dispersing in the vehicle X a dispersible phase that is formed of the aforesaid water insoluble incompletely reacted aminoplast condensate, preferably while the condensate forms essentially the external phase of a molten essentially homogeneous system (preferably retaining some plasticizing water).

Another aspect of the invention shown in the subsequent Example 65 is specific to the use of aromatic aminoplasts.

EXAMPLE 65

A charge of 30 g. of a 44% of styrenated-alkyd resin in Inkol–O, 40.8 paratoluenesulfonamide, 1 g. of Brilliant Yellow 6 G base, 0.17 g. of Rhodamine 6 G and 0.3 g. of Rhodamine B-Extra is heated with stirring, in a disperser up to 140° C. There is then added slowly a charge of 8.4 g. of A-stage unmodified melamine-formaldehyde condensate (Resimene 814) and the temperature is allowed to drop to 120° C. at which time 7.6 g. of (95% active) paraformaldehyde is slowly added. The resultant mixture is heated with continued agitation to about 170° C. and held for 10 minutes when dispersion is complete. The resulting dispersion X is used as a concentrate for formation of an ink (having the superior properties previously described).

In the procedure of the foregoing paragraph, the ink concentrate is, of course, ultimately cooled to room temperature; but after formation in situ of a dispersed phase and advancement of its condensation in situ is quite clearly carried out, so that (and to the extent that) such dispersed phase finely divided discrete solidified particles actually obtained do not tend to coalesce in such ink concentrate and/or inks made therefrom in the course of the ordinary (ink) usage contemplated therefor.

In the dispersion X of the foregoing Example 65, the substantially uniformly discrete finely divided, generally rounded solid particles of synthetic organic dispersed phase resin ultimately obtained are understood to be formed of an aromatic-aminoplast resin. The procedure employed is such that one avoids significant premature conversion (even at the addition temperatures of about 120° C. to 140° C.) of the melamineformaldehyde component per se to a water insoluble thermoset resin (i.e., at the exclusion of the toluene sulfonamide as a coreactant). Instead, the technique employed is understood to be such that the co-condensation (of the melamine-formaldehyde additive) with the toluenesulfonamide prior to such "premature" (melamine-formaldehyde) conversion, is believed to be substantially achieved; and it is believed that the foregoing procedure may involve an initial substantially uniform dispersion in the vehicle X of an essentially molten toluenesulfonamide, as one of the recognized co-condensation reactants (ultimately to be substantially completely reacted with the melamine and formaldehyde), not only in theory but in actual practice in Example 65. Conversion of the A-stage melamine-formaldehyde condensate per se, i.e. homo-condensation thereof to exclusion of other reactants present to form an infusible thermoset resin, involves a certain amount of time no matter what the temperature might be. Although a production scale procedure of Example 65 may leave something to be desired in such respects as reaction control (via pH control, buffer concentration, dispersion and/or agitation rates, temperature control, etc.), such control can be effected, and this is actually done in Example 65. Thus, the actual procedure of Example 65 effects initially the rapid formation of a dispersed phase incompletely reacted aromatic-aminoplast condensate substantially immediately upon and/or after initial contact within the heated dispersed phase of the (presumably molten) toluenesulfonamide and the A-stage melamine-formaldehyde condensate; and the subsequent addition in Example 65 of paraformaldehyde (at 120° C.) is timed so that it expedites or supplements advancement of such initially incomplete co-condensation. Advancement of the co-condensation in the dispersed phase (i.e. of the resultant initially formed toluenesulfonamide-melamine-formaldehyde incompletely reacted substantially molten dispersed phase co-condensate) then proceeds under the specified conditions of agitation and temperature of 120° C. upwardly (i.e., for effectively volatilizing water) until the resultant discrete finely divided dispersed phase will not coalesce at room temperature under normal conditions of use (i.e. in inks as suggested in Example 65), at which stage substantial co-condensation advancement has been effected.

As previously indicated, it is believed that, even at the initial stage (i.e. the so-called "A-stage") of the formation of an aromatic aminoplast incompletely reacted condensation product, such product is substantially water insoluble. This, of course, presupposes the formation of such earliest, initial or A-stage condensate from resinformers which include something more than an infinitesimal mol percent of aromatic resin former in such initial co-condensate but such concept must also be recognized as substantially capable of only a reasonably approximate definition in terms of an actual numerical recital of a minimum mol percent for the aromatic resin former in terms of total resin former used because of considerable variety in hydrophilic-hydrophobic properties of the various [momo- and/or poly-(NH$_2$) and/or (—NH—)] resin formers per se which may be used herein (in combination with the so-called resin former reactant linking agent: formaldehyde) as well as the variety of hydrophilic-hydrophobic properties which the various condensates and co-condensates develop even during the very earliest stages of reaction with formaldehyde.

In totaling the molar proportions of "resin former" reactants employed in formulating the dispersed phase, the linking agent, formaldehyde, is not added in although we have pointed out that, in using a true shortage of formaldehyde in a given formulation, one may obtain a condensate thereof with a given combination of "resin formers" which exhibits distinct thermoplastic properties and a comparatively lower softening point, whereas with somewhat more formaldehyde such resin former combination will react to form a condensate having a higher softening point and/or limited thermoplasticity in that it often remelts a number of times before it reaches a final thermoset state (as a consequence of its final melting—as a so-called "thermosetting" condensate). Such a condensate formulation will require a certain minimum formaldehyde reactant, and also a certain minimum thermosetting type resin former concentration, e.g., a given mol percent of melamine as an aminoplast resin formed reactant. In the present invention it has also been found to be preferable to include within such resin former reactant component an amount of an aromatic reactant that is best described as being sufficient to render the initial and/or A-stage aminoplast condensate substantially water insoluble. This does not mean that it is absolutely necessary to include an aromatic reactant, since it is possible to use resin formers which do not include such an aromatic reactant and carry the resultant "non-aromatic" aminoplast condensation reaction to a more advanced stage (e.g. to a relatively advanced water insoluble B-stage melamine-formaldehyde or melamine-urea-formaldehyde aminoplast) prior to bringing such incompletely condensed aminoplast into initial contact with the vehicle X for dispersion and condensation advancement therein.

On the other hand, it is apparent from Example 65 that, if the dispersed phase is to be an aromatic aminoplast, it is possible to introduce the condensate resin-formers separately into vehicle X under the condition specified. It will be appreciated that although the A-stage melamine-formaldehyde condensate so introduced into the vehicle X in Example 65 is substantially water-soluble, it is actually converted very rapidly by co-condensation with the toluenesulfonamide into an A-stage aromatic aminoplast, upon its dispersion into vehicle X. The toluenesulfonamide thus available for substantially immediate co-condensation with the melamine-formaldehyde effectively converts the dispersed phase to a substantially water insoluble (A-stage) incompletely reacted aromatic aminoplast condensate, which then proceeds to undergo advancement of the condensation in the dispersed phase condition (i.e. as an essentially external aromatic aminoplast condensate defining each dispersed phase globule).

As just mentioned, the molar proportion of aromatic resin-former (e.g. toluenesulfonamide, benzoguanamine, phenol, etc.) used in the practice of the invention is preferably at least a proportion sufficient to render the initial or A-stage condensate substantially water insoluble, particularly in the case of a procedure such as that of Example 65. On the other hand, even less aromatic resin-former (or none at all) can be used, if the condensation is first carried out to obtain a substantially water insoluble condensate which is then initially contacted with the vehicle X, before further advancement of condensation. Additional advantages in final product light stability, good dye retention, etc. are achieved, in addition to good function in the dispersing procedure, particularly if the aromatic resin former (particularly aromatic amide or amine resin former) is used in at least about 10 mol percent of the resin former in the condensate.

The term "aminoplast" used often herein is understood to be fully accepted in the synthetic resin art. Nevertheless, it should be clear from the foregoing that this term is used herein to define synthetic resinous condensates and/or co-condensates of aldehydes (i.e., ordinarily formaldehyde and/or its recognized equivalents recited herein) and resin-formers which contain a plurality of "aldehyde-reactive" H's each attached to N in —NH— groups (e.g. non-cyclic or intracyclic —NH— groups and/or non-cyclic $—NH_2$ groups, in which latter case two such reactive H's are attached to the same N), with such —NH— groups each being attached to (I) $—SO_2—$ (e.g., in the sulfonamides hereof) or to (II) a C atom which, in turn, is attached by a double bond to =O, =S, or =N— (which =N— may be non-cyclic or intracyclic). Such definition is fundamental to resin chemists (who sometimes refer to "aminoplasts" as "amide-aldehydes" or "amine-aldehydes" resins). An aromatic or a benzenoid aminoplast is simply a species of aminoplast formed by such condensation of the aldehyde and an aromatic or a benzenoid resin-former, e.g., toluenesulfonamide, benzoguanamine, etc., and a co-condensate aminoplast is a species of aminoplast condensate resulting from the condensation reaction (to varying extents from initial to final reaction) of the aldehyde in which at least two different resin-former reactants (as previously defined) have participated (e.g., "aromatic" toluenesulfonamide and melamine, which is "cyclic" or "heterocyclic" but not "aromatic"). A toluenesulfonamide-melamine-formaldehyde aminoplast co-condensate is thus described in the art as aromatic, benzenoid, cyclic and/or heterocyclic. In contrast, a simple aminoplast condensate of melamine and formaldehyde formed from these two materials only is sometimes referred to as a homo-condensate (i.e., a species of the term "condensate" differing from the "co-condensates" just defined). The nomenclature used in this specification and claims has the generally understood and accepted meaning and significance outlined herein.

We claim as our invention:

1. A method of producing an improved solid-film-forming dispersion of solid particles in a liquid vehicle, which comprises the steps of (a) bringing into initial contact (1), as a dispersible phase, a substantially water insoluble and substantially incompletely reacted amide-aldehyde condensation reaction product, capable of conversion to the molten state, and (2), as a continuous phase, a liquid vehicle that is substantially immiscible with said product; (b) subjecting the resultant admixture, containing such dispersible phase in a substantially molten state, to agitation in combination with time-temperature conditions sufficient to effect the formation of a discrete, finely divided dispersed phase, and to advance the condensation reaction until such discrete finely divided dispersed phase will not coalesce at substantially ambient room temperature under normal conditions of use; and (c) effecting substantially ambient temperature conditions in the admixture while retaining such discrete finely divided dispersed phase; said continuous phase vehicle being maintained liquid during steps (a), (b) and (c), and being a solid-film-forming binder for the resultant solid particulate dispersed phase carried thereby.

2. The method of claim 1 wherein prior to being contacted with the vehicle (2) in step (a), such product (1) is liquefied by effecting such incomplete reaction of the amide-aldehyde condensation to obtain a substantially homogeneous molten single-phase amide-aldehyde condensate product (1), the temperature conditions of step (b) are sufficient to substantially volatilize water, and such admixture is cooled in step (c) to convert the admixture to substantially room temperature conditions.

3. The method of claim 2 wherein water is present during such incomplete reaction and is retained with such molten single-phase as a non-solvent plasticizer imparting free-flowing properties to said product (1) and dispersed globules formed therefrom initially during step (b).

4. The method of claim 2 wherein such substantially homogeneous single-phase free-flowing molten condition of said product in dispersed phase globular form is retained during substantially the advancement of condensation with accompanying release therefrom of water, while said continuous phase in step (b) has a viscosity sufficient to shear such dispersed phase gloubules into discrete, finely divided submicron particulate form.

5. A method as claimed in claim 1 wherein the reaction product (1), when brought initially into contact with the liquid vehicle forming the continuous phase (2), is itself composed of an external phase of such amide-aldehyde condensate.

6. The method claimed in claim 5 wherein such external condensate phase of product (1) is plasticized to form in such vehicle (2) discrete globules each composed essentially of said external condensate phase in free-flowing condition contacting said vehicle (2) along substantially the entire peripheral surface of each such globule, whose interior is also composed essentially of said condensate phase that is in free-flowing condition to effect readily recurring release of volatilized components therefrom with accompanying recurring condensate globule reformation such as to substantially minimize fluid entrapment within ultimately formed solidified particulate dispersed phase.

7. The method of claim 6 wherein said condensate remains as the external phase of such disposed globules contacting said vehicle over substantially the entire generally spheroidal globule surface during such condensation advancement.

8. The method of claim 7 wherein such external condensate phase within each such globule is effectively retained in free-flowing condition so that during the initial advancement of condensation under the aforesaid agitation-temperature conditions such globules will disperse readily in such vehicle (2) into substantially uniform, discrete, finely and uniformly distributed conditions, in which latter condition the dispersed phase is substantially retained during substantially the advancement of condensation with accompanying release of water from such external condensate phase within each globule of the resulting dispersed particulate phase in the ultimate dispersion.

9. The method of claim 1 wherein said condensation reaction product of step (a) is an aromatic amide-aldehyde condensate.

10. The method of claim 9 wherein said aromatic amide-aldehyde condensate is an A-stage condensate formed of an aromatic resin forming reactant in an amount sufficient to render the A-stage condensate substantially water insoluble.

11. The method of claim 1 wherein the continuous vehicle is formed of an oil-modified alkyd resin, as a solid-film-former.

12. The method of claim 1 wherein the continuous vehicle is formed of at least substantially 50 weight percent oil-modified benzenoid alkyd.

13. The method of claim 12 wherein said alkyd is copolymerized with vinyl benzenoid compound.

14. The method of claim 1 wherein step (b) is carried out to advance the condensation to obtain a thermoplastic resinous dispersed phase.

15. The method of claim 1 wherein step (b) is carried out to advance the condensation to obtain a thermoset resinous dispersed phase.

16. The method of claim 1 wherein (3) a selective light-absorbing agent is introduced into said admixture, and wherein said dispersed phase is capable of selectively absorbing such agent, and retains such agent in such dispersion substantially preventing such agent from migration into said contiuous phase.

17. The method of claim 16 wherein said agent (3) is introduced with said reaction product (1).

18. The method of claim 16 wherein said agent (3) is a coloring agent.

19. The method of claim 18 wherein said coloring agent consists of at least one dye.

20. The method of claim 19 wherein said coloring agent consists of at least one daylight fluorescent dye in a concentration effective for daylight fluorescence.

21. The method of claim 1 wherein step (b) is carried out to advance the condensation to obtain a thermosetting resinous dispersed phase.

22. The method of claim 4 wherein step (b) is carried out under conditions of time, temperature and shearing viscosity of the continuous phase, having at least substantially 50% solids content therein, to effect formation of dispersed phase particles of substantially submicron sizes.

23. The method of claim 22 wherein formation of substantially 0.01 to 0.02 micron particle sizes is effected.

24. The method of claim 22 wherein such particles consist essentially entirely of generally spheroidal particles within a range of substantially ⅓ to 3 times the average particle size.

25. The method of claim 24 wherein the particle size range is substantially 0.2 to 0.6 micron and there is incorporated in said particles a daylight fluorescent dye in an amount effective for daylight fluorescence of dominant wavelength in said range.

26. A method of producing an improved solid-film-forming dispersion of solid particles in a liquid vehicle, which comprises the steps of (2) contacting (1), as a dispersible phase, a substantially incompletely reacted aromatic-aminoplast condensation reaction product, capable of conversion to the molten state, and (2) a liquid vehicle, as a continuous phase, that is substantially immiscible with said product; (b) subjecting the admixture, containing such dispersible phase in a substantially molten state, to agitation in combination with time-temperature conditions sufficient to effect the formation of a discrete, finely divided dispersed phase, and to advance the condensation reaction until such discrete finely divided disperse phase will not coalesce at room temperature under normal conditions of use; and (c) effecting substantially room temperature in said admixture while retaining such discrete finely divided dispersed phase; said continuous phase vehicle being maintained liquid during steps (a), (b) and (c), and being a solid-film-forming binder for the resultant solid particulate dispersed phase carried thereby.

27. The method of claim 26 wherein the aromatic-aminoplast is formed by reaction of formaldehyde and a resin-forming reactant therefor which contains at least substantially 10 mol percent of an aromatic resin-forming reactant, which aminoplast has undergone sufficient condensation to render it substantially water insoluble.

28. The method of claim 27 wherein the aromatic aminoplast is an aromatic sulfonamide-polyaminotriazine-formaldehyde reaction product that is subjected to temperatures sufficient to substantially volatilize water in step (b) and cooled in step (c) to substantially ambient storage room temperature conditions.

29. The method of claim 27 wherein the aromatic aminoplast is an aromatic sulfonamide aminoplast condensate.

30. The method of claim 26 wherein the aromatic aminoplast is an A-stage condensate formed from an aromatic resin-forming reactant in an amount sufficient to render the A-stage condensate substantially water insoluble.

31. The method of claim 30 wherein such A-stage condensate is pre-formed before initial contact with said continuous phase.

32. The method of claim 26 wherein step (b) is carried out to advance the condensation to obtain a thermoplastic resinous dispersed phase.

33. The method of claim 26 wherein step (b) is carried out to advance the condensation to obtain a thermosetting resinous dispersed phase.

34. The method of claim 26 wherein step (b) is carried out to advance the condensation to obtain a thermoset resinous dispersed phase.

35. The method of claim 26 wherein (3) a selective light-adsorbing agent is introduced into said admixture, and wherein said dispersed phase is capable of selectively adsorbing such agent, and retains such agent in such dispersion substantially preventing such agent from migration into said continuous phase.

36. The method of claim 35 wherein said agent (3) is a coloring agent that consists of at least one dye.

37. The method of claim 36 wherein said coloring agent consists of at least one daylight fluorescent dye in a concentration effective for daylight fluorescence.

38. A method of producing an improved solid-film-forming dispersion of solid particles in a liquid vehicle, which comprises the steps of (a) bringing into initial contact (1), as a dispersible phase, a substantially water insoluble and substantially incompletely reacted amide-aldehyde condensation reaction product, capable of conversion to the molten state, and (2), as a continuous phase, a liquid vehicle that is substantially immiscible with said product; (b) subjecting the resultant admixture, containing such dispersible phase in a substantially molten state, to agitation in combination with temperature sufficient to volatilize water, to effect the formation of a discrete, finely divided dispersed phase, and to advance the condensation reaction until such discrete finely divided dispersed phase will not coalesce at room temperature under normal conditions of use; and (c) cooling the admixture while retaining such discrete finely divided dispersed phase; said continuous phase vehicle being maintained liquid during steps (a), (b) and (c), and being a solid-film-forming binder for the resultant solid particulate dispersed phase carried thereby.

39. A method of producing an improved solid-film-forming dispersion of solid particles in a liquid vehicle, which comprises the steps of (a) contacting (1), as a dispersible phase, a substantially incompletely reacted aromatic-aminoplast condensation reaction product, capable of conversion to the molten state, and (2) a liquid vehicle, as a continuous phase, that is substantially immiscible with said product; (b) subjecting the admixture, containing such dispersible phase in a substantially molten state, to agitation in combination with temperature sufficient to volatilize water, to effect the formation of a discrete, finely divided dispersed phase, and to advance the condensation reaction until such discrete finely divided dispersed phase will not coalesce at room temperature under normal conditions of use; and (c) cooling the admixture while retaining such discrete finely divided dispersed phase; said continuous phase vehicle being maintained liquid during steps (a), (b) and (c), and being a solid-film-forming binder for the resultant solid particulate dispersed phase carried thereby.

40. The method of claim 38 wherein said reaction product is a condensate of formaldehyde and a resin-former whose molecule contains a plurality of reactive H's each attached to an N atom in an —NH— group wherein such N atom is connected directly by a single bond to a C atom which in turn is connected directly by a double bond to an atom selected from the class consisting of O, S and N.

41. The method of claim 39 wherein said reaction product is a condensate of formaldehyde and a resin-former whose molecule contains a plurality of reactive H's each attached to an N atom in an —NH— group wherein such N atom is connected directly by a single bond to a C atom which in turn is connected directly by a double bond to an atom selected from the class consisting of O, S and N.

42. The method of claim 26 wherein the continuous vehicle is formed of an oil-modified alkyd resin, as a solid-film-former.

43. The method of claim 26 wherein the continuous vehicle is formed of at least substantially 50 weight percent oil-modified benzenoid alkyd.

44. The method of claim 43 wherein said alkyd is copolymerized with vinyl benzenoid alkyd.

References Cited

UNITED STATES PATENTS

| | | | |
|---|---|---|---|
| 2,653,919 | 9/1953 | Hunter | 260—23 |
| 2,776,267 | 1/1957 | Weber | 260—21 |
| 2,938,873 | 5/1960 | Kazenas | 252—301.2 |

TOBIAS E. LEVOW, *Primary Examiner.*

ROBERT D. EDMONDS, *Assistant Examiner.*

UNITED STATES PATENT OFFICE
CERTIFICATE OF CORRECTION

Patent No. 3,412,035                            November 19, 1968

Maurice D. McIntosh et al.

It is certified that error appears in the above identified patent and that said Letters Patent are hereby corrected as shown below:

Column 1, line 49, after "of" insert -- grindability. Pigments made from such thermoplastic --. Column 3, line 71, after "resin" insert -- in --. Column 4, line 4, "neightborhood" should read -- neighborhood --. Column 5, line 21, "polyamino," should read -- polyamino --. Column 6, line 74, "ultimiate" should read -- ultimate --. Column 7, line 24, "particles" should read -- particle --; line 36, "halo styrenes" should read -- halostyrenes --. Column 13, line 21, "erities" should read -- erties --; line 71, "2.3'" should read -- 2,3' --. Column 14, line 34, "adition" should read -- addition --; line 41, "minutes" should read -- minute --; line 51, "stiring" should read -- stirring --; same line 51, "melamide" should read -- melamine --; line 61, "minnutes" should read -- minutes --; line 70, "posses" should read -- possess --. Column 17, line 25, "subsatntially" should read -- substantially --; line 28, "benzoquanamine" should read -- benzoguanamine --. Column 18, line 72, "previosuly" should read -- previously --; line 73, "bases" should read -- base, --. Column 19, line 2, "agitation and held there until all of the water is apparent-" should read -- agitated in a high speed disperser at 95° C. for about 10 --; line 6, "apperent-" should read -- apparent- --. Column 20, line 1, "violet" should read -- violent --; line 17, "previosuly" should read -- previously --. Column 22, line 15, "grams" should read -- gram --; line 20, "produce" should read -- product --; line 24, "of" should read -- to --; line 39, "melamide" should read -- melamine --. Column 23, line 22, "dispenser" should read -- disperser --. Column 25, line 10, "hydrophenyl" should read -- hydroxyphenyl --; line 12, "dispersed" should read -- disperser --; line 50, "alkyl" should read -- alkyd --; line 71, "dispenser" should read -- disperser --. Column 26, line 3, "as" should read -- is --; line 33, after "of" insert -- the --. Column 27, line 54, "is" should read -- at --; line 64, "precisely" should read -- previously --. Column 30, line 38, "toleuenesulfonamide" should read -- toluenesulfonamide --; line 53, "to a" should read -- to the --; line 56, "appearantly" should read -- apparently --. Column 31, line 2, "cacromole-" should read -- macromole- --; line 4, "ureau" should read -- urea --; line 7, "(Ex. 454" should read -- (Ex. 45) --; line 17, "condenration" should read -- condensation --; line 19, "substantialy" should read -- substantial --

3,412,035

(2)

line 34, "tends" should read -- tend --. Column 34, line 41, "alkyl" should read -- alkyd --; line 48, "alkyl" should read -- alkyd --; line 51, "alkyl" should read -- alkyd --. Column 35, line 55, "amide" should read -- amine --. Column 36, line 27, "proudced" should read -- produced --. Column 37, line 41, "pertoleum" should read -- petroleum --. Column 38, line 33, "substantially" should read -- substantial --. Column 40, line 21, after "0.38" insert -- gram --; line 22, "toluene-sulmonamide" should read -- toluenesulfonamide --; line 56, "dryers" should read -- driers --. Column 42, line 31, "pulversized" should read -- pulverized --. Column 45, line 16, "particules" should read -- particles --; line 30, "liqiud" should read -- liquid --. Column 46, line 36, "characteristics" should read -- characteristic --; line 41, after "are" insert -- in --; line 43, "unreide" should read -- ureide --; line 50, "benzeoid" should read -- benzenoid --; line 58, cancel "measur-"; line 59, cancel "ing techniques now reveal that the bulk or substantial". Column 47, line 38, after "40.8" insert -- g. --; line 67, "melamineformaldehyde" should read -- melamine-formaldehyde --. Column 48, line 49, "momo-" should read -- mono- --. Column 51, line 2, "disposed" should read -- dispersed --. Column 52, line 12, "disperse" should read -- dispersed --.

Signed and sealed this 9th day of June 1970.

(SEAL)
Attest:

EDWARD M. FLETCHER, JR.
Attesting Officer

WILLIAM E. SCHUYLER, JR.
Commissioner of Patents